(12) United States Patent
Jitaru

(10) Patent No.: US 12,512,750 B2
(45) Date of Patent: Dec. 30, 2025

(54) ENERGY EXTRACTION AND UTILIZATION FROM THE PARASITIC ELEMENTS IN POWER CONVERTERS

(71) Applicant: Rompower Technology Holdings, LLC, Milford, DE (US)

(72) Inventor: Ionel Jitaru, Tucson, AZ (US)

(73) Assignee: Rompower Technology Holdings, LLC, Milford, DE (US)

( * ) Notice: Subject to any disclaimer, the term of this patent is extended or adjusted under 35 U.S.C. 154(b) by 0 days.

(21) Appl. No.: 18/373,877

(22) Filed: Sep. 27, 2023

(65) Prior Publication Data

US 2024/0022165 A1   Jan. 18, 2024

Related U.S. Application Data

(60) Continuation-in-part of application No. 18/233,315, filed on Aug. 12, 2023, now abandoned, and a continuation-in-part of application No. 18/199,959, filed on May 21, 2023, which is a continuation of application No. 17/495,170, filed on Oct. 6, 2021, (Continued)

(51) Int. Cl.
  *H02M 1/34* (2007.01)
  *H02M 1/00* (2007.01)
  *H02M 3/00* (2006.01)
  *H02M 3/335* (2006.01)

(52) U.S. Cl.
  CPC ......... *H02M 1/342* (2021.05); *H02M 1/0058* (2021.05); *H02M 3/01* (2021.05); *H02M 3/33553* (2013.01); *H02M 3/33571* (2021.05)

(58) Field of Classification Search
  CPC ...... H02M 1/08; H02M 1/083; H02M 1/0048; H02M 1/0051; H02M 1/0054; H02M 1/0058
  See application file for complete search history.

(56) References Cited

U.S. PATENT DOCUMENTS

| | | | | |
|---|---|---|---|---|
| 5,724,236 A | * | 3/1998 | Oglesbee | H02M 3/28 363/40 |
| 6,018,467 A | * | 1/2000 | Majid | H02M 3/33523 363/16 |
| 6,069,803 A | * | 5/2000 | Cross | H02M 3/01 363/56.11 |
| 6,272,023 B1 | * | 8/2001 | Wittenbreder | H02M 3/33592 363/16 |

(Continued)

*Primary Examiner* — Gustavo A Rosario-Benitez
(74) *Attorney, Agent, or Firm* — Thomas W. Galvani, P.C.; Thomas W. Galvani

(57) ABSTRACT

A switching power conversion apparatus includes an input voltage source, an output load, a first switch connected to a switching node, and a second switch connected to the switching node. An inductive element has a magnetizing current connected to the switching node. The inductive element delivers energy via the first and second switches from the voltage source to the load during power conversion cycles. A capacitance connected to the switching node can resonate with the inductive element during a portion of the power conversion cycles to cause a parasitic oscillation. A first clamp subcircuit is across the inductive element and contains a unidirectional auxiliary switch to trap energy from the inductive element and store it into the storage capacitor and prevent parasitic oscillation. The auxiliary switch is complementary to the first switch. A current source discharges the storage capacitor and uses the energy in the switching power conversion apparatus.

10 Claims, 28 Drawing Sheets

Related U.S. Application Data now Pat. No. 11,671,027, said application No. 18/233,315 is a continuation of application No. 17/495,245, filed on Oct. 6, 2021, now Pat. No. 11,728,723, said application No. 17/495,170 is a continuation of application No. 16/751,747, filed on Jan. 24, 2020, now Pat. No. 11,165,360, which is a continuation of application No. 16/503,432, filed on Jul. 3, 2019, now Pat. No. 10,574,148, said application No. 17/495,245 is a division of application No. 15/825,647, filed on Nov. 29, 2017, now Pat. No. 11,152,847.

(60) Provisional application No. 63/578,130, filed on Aug. 22, 2023, provisional application No. 63/377,229, filed on Sep. 27, 2022, provisional application No. 62/429,373, filed on Dec. 2, 2016.

(56) References Cited

U.S. PATENT DOCUMENTS

| | | | |
|---|---|---|---|
| 6,522,108 B2 | 2/2003 | Prager et al. | |
| 7,012,817 B2* | 3/2006 | Liu | H02M 1/34 363/20 |
| 8,907,581 B2* | 12/2014 | Ivankovic | H05B 45/382 315/210 |
| 2009/0097281 A1* | 4/2009 | Lin | H02M 3/33569 363/21.18 |
| 2014/0265916 A1* | 9/2014 | Melanson | H05B 45/385 315/291 |
| 2015/0162845 A1* | 6/2015 | Lee | H02M 3/33507 363/17 |
| 2015/0381072 A1* | 12/2015 | Sasaki | H02M 7/217 363/89 |
| 2018/0323713 A1* | 11/2018 | Beland | H02M 3/1582 |
| 2019/0222127 A1* | 7/2019 | Phadke | H02M 3/33523 |

* cited by examiner

Energy Preservation Module (EPM)

Energy Extraction Module (EEM)

Current Injection Module (CIM)

(Connected to the E node Of the EEM)

$$W_p = \frac{1}{2} C_p (V_{in}^2 - V_o^2)$$

Fig. 3C $$W_{Rp} = \frac{1}{2} C_p (V_o^2 - (V_o - V_{CR}^2))$$

Fig. 4C $$W_{pBulk} = \frac{1}{2} (C_{p1} + C_{p2})(2V_o)^2$$

Fig. 7C $$W_{pBulk} = \frac{1}{2}(C_{p1} + C_{p2})((V_o + V_{CR})^2 - V_o^2)$$

Fig. 8C $$W_{p\,Flyback} = \frac{1}{2}C_p[(V_{in} + N*V_o)^2 - V_o^2]$$

Fig. 10C $$W_{p-TT\,forward} = \frac{1}{2}(C_{p1} + C_{p2})\left(\frac{V_{in}}{2}\right)^2$$

Fig. 12C1

$$I_{Mx} = \frac{1}{2} * \frac{V_{in}}{\sqrt{\dfrac{L_p}{C_{p1} + C_{p2}}}}$$

Fig. 12C2

ENERGY EXTRACTION AND UTILIZATION FROM THE PARASITIC ELEMENTS IN POWER CONVERTERS

CROSS-REFERENCE TO RELATED APPLICATIONS

This application is a continuation in part of and claims the benefit of prior U.S. patent application Ser. No. 18/233,315 filed Aug. 12, 2023, is a continuation in part of and claims the benefit of prior U.S. patent application Ser. No. 18/199,959 filed May 21, 2023, and claims the benefit of prior U.S. Provisional Application No. 63/377,229 filed Sep. 27, 2022, and of prior U.S. Provisional Application No. 63/578,130 filed Aug. 22, 2023.

TECHNICAL FIELD

This specification pertains to electronic devices employing a power converter configured around the topologies used in power converters.

BACKGROUND

All the topologies utilized in power conversion, naming just several, buck, boost, flyback, half bridge, full bridge, contain switching devices connected to switching nodes. In FIG. 1A is presented such a switching device connected to a switching node. A capacitance C,120 is connected to the switching node, regardless of the type of the switching device. To the switching node other devices are connected such additional switching devices Sn,130 and inductive elements such as Ln,140. The specific inductive element Ln has two terminations, terminal W1, 4100 of the inductive element connected to the switching node, and the second terminal of the inductor element, labeled, W2, 4110.

During the time all the switching devices connected to the switching node are off, the inductive elements connected to the switching node which form a resonant circuit with the capacitance C,120 and oscillations do occur in the switching node. This time period is referred to as "dead time". The oscillations which occur during the dead time are named, "parasitic oscillations" and the energy contained in the "parasitic oscillations energy" named also as the "parasitic energy".

This specification presents several solutions of extracting the "parasitic energy" which is the energy contained in the resonant elements connected to the switching node and as a result minimizing and even eliminating these oscillations. In most of the applications a significant portion of this energy is dissipated. In addition to that the "parasitic oscillations" will inject noise into the components placed near the resonant elements. This specification presents several solutions in harvesting the energy in the "parasitic oscillations" and use that energy for improving the power conversion efficiency, such as creating zero voltage switching conditions on the switching elements, this being one of the embodiments of this specification. One solution to eliminate the oscillation in the switching nodes is presented in U.S. Pat. No. 6,522,108B2. In this patent Prager presents a unidirectional switch is placed across the inductive elements connected to the switching node as is depicted in FIG. 2A. In FIG. 2B are depicted the key waveforms of circuit from FIG. 2A.

The Prager' patent presents a solution designed to eliminate the ringing.

In FIG. 3A is presented a boost topology and in FIG. 3B are presented the key waveforms of a boost converter. The boost topology contains and inductive element L, 220, a switching element, M1,210, across which there is a parasitic capacitance Cp,300, parasitic capacitance being the summation of the parasitic capacitance of the semiconductor, device used as a switch, together with the parasitic capacitance reflected from the inductor element L and the rectifier means Do, 240. The boost topology contains further a rectifier means, Do, and the output load which is formed by an output capacitor Co, 250 and an output load Rload, 330.

In between t0 to t1, the main switch M1, is turned on by the control signal VcM1, 270, and during this time the current through L,220, builds up reaching a peak current Ipk, 360. During this time interval, energy is accumulated in the inductive element L.

At t1, the switch M1, 210, is turned off and the energy stored in between t0 to t1 is delivered to the "output load" formed by Co, 250 and the load, $R_{Load}$, 330. As the energy is transferred to the output load, the current through the inductive element is decreasing with a rate given by the difference (Vo-Vin) and the inductance of L, 220. At t2, the current through Do, 240 will reach zero, which means that all the energy stored in L, 220, is delivered to the output load.

In between t2 to t3, referred also as the dead time, wherein "parasitic oscillations" occur in the switching node, A, 280, depicted by V(M1) waveforms. The oscillations do have peaks, Vpk, 340 and valleys, Vv, 350. These oscillations do reflect also in the current through L, 220 which is depicted by the IL waveforms, 290. The "parasitic oscillations" are caused by the resonant circuit formed by the inductive element L, 220 and the parasitic capacitance Cp, 300. Said resonant circuit is energized by the energy defined by the formula presented in FIG. 3C.

In the case wherein the boost converter is used in Power Factor Correction (PFC) application, the Wp can be quite significative at low AC input voltage, in PFC application being Vin=127 Vdc (90 Vac) and 400V output. For a parasitic capacitance Cp=100 pF the Wp energy is 7.19 uJ. For an operation frequency of 150 Khz the power dissipation in the parasitic ringing, if not extracted, can reach 1W.

This specification presents a method of extracting this energy and use that energy for other purposes. One of the preferred embodiments is using this energy to obtain zero voltage switching conditions for the main switch, M1, 210.

In U.S. Pat. No. 6,522,108B2, the parasitic oscillations are eliminating by creating a short circuit across the inductive element and store that energy through the magnetizing current of the inductive element. In FIG. 2A the short is created by the switch Rs,30 and the diode 32. Preserving energy by shorting an inductive element has the disadvantage of dissipation of some of the energy through the conduction in the inductive element and the unidirectional switch formed by Rs,30 and diode 32. For a larger "dead time", defined by the time difference t3-t2, this method depicted in FIGS. 2A and 2B is not efficient and a good portion of the energy would be dissipated in conduction. This drawback is eliminated by Jitaru in U.S. Pat. No. 11,152,847, wherein this specification is a continuation in part.

BRIEF DESCRIPTION OF THE DRAWINGS

Referring to the drawings:

FIG. 3C presents the formula for the energy contained in the parasitic oscillation of a boost topology.

FIG. 4C depicts the formula for calculating the parasitic oscillation energy in boost topology.

FIG. 7C presents the formula of the parasitic oscillation energy in buck topology.

FIG. 8C presents formula for the energy contained in the parasitic oscilation of the buck topology.

FIG. 10C presents the formula of the parasitic energy in flyback topology.

FIG. 12C1 presents the formula for the energy contained in parasitic oscillation in two transistor forward topology.

FIG. 12C2 presents the formula for the negative magnetizing current in two transistor forward topology.

DETAILED DESCRIPTION

Figure 1A:
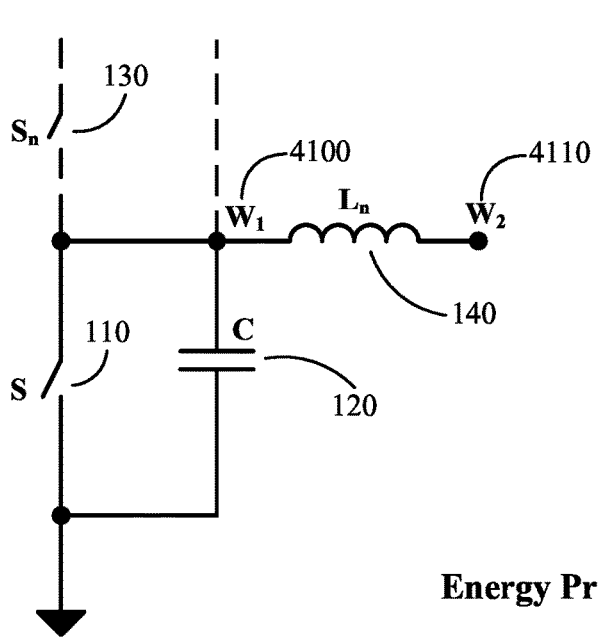
FIG. 1A depicts a switch node which is the building block of a power converter.
Figure 1B:
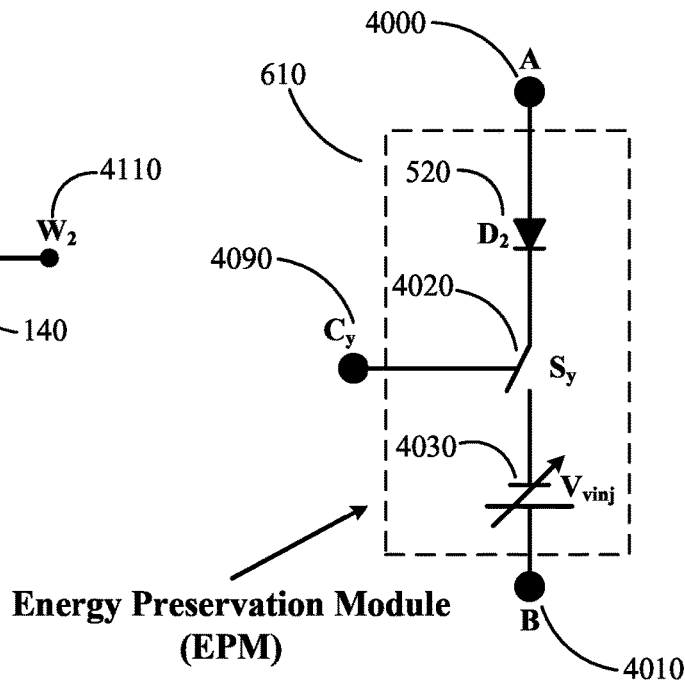
FIG. 1B depicts an intelligent Energy Preservation Module.

In this specification, two modules are introduced. The first module depicted in FIG. 1B, 610, is referred to as "Energy Preservation Module", EPM. It has two power terminations A, 4000 and B, 4010, and a signal connection, Cy, 4090.

The EPM, 610 is composed by an unidirectional switch formed by diode D2, 520, and a controlled switch Sy 4020, and a controlled voltage source, Vvinj, 4030. All these three said components are placed in series in any order. The presence of Vvinj, 4030, allows an injection of energy into the power converter wherein the EPM, 610, module is connected. This method is presented in the U.S. Pat. Nos. 11,728,723, and 11,152,847 B2, wherein this patent is a continuation in part.

The switch Sy, 4020, is controlled by the signal Vcsy, which is connected to the signal connection Cy, 4090.

Figure 1C:
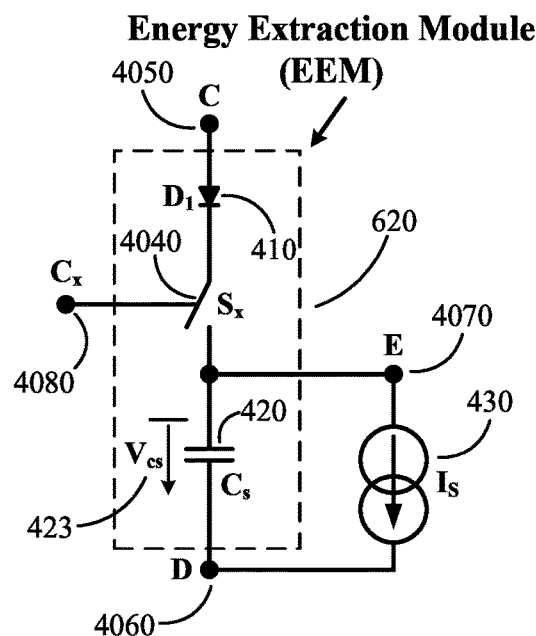
FIG. 1C depicts an intelligent Energy Extraction Module.
Figure 1D:
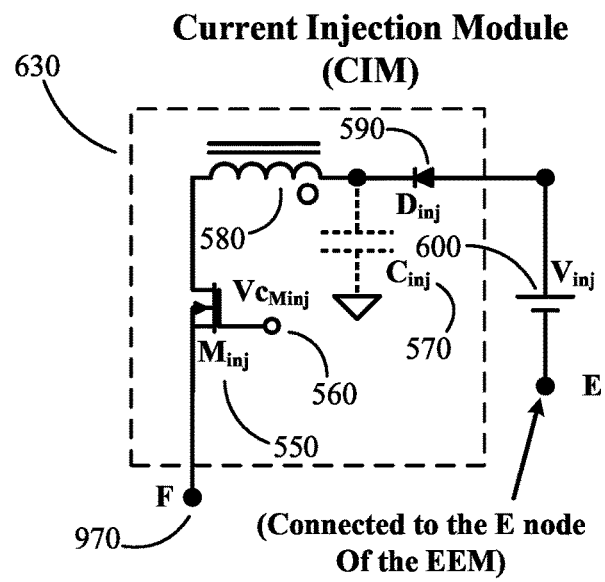
FIG. 1D depicts the current injection module.

The second module depicted in FIG. 1C, 620, is referred to as "Energy Extraction Module", EEM. The EEM has two power terminations, C, 4050 and D, 4060 and a signal connection Cx, 4080 and another auxiliary connection, E, 4070. A current source Is, 430, is connected to E, 4070. The purpose of Is, 430, is to extract the energy stored in Cs, 420, and use that energy for a given purpose.

The presence of Cs, 420 and the termination E, 4070, allows the energy extracted from the "Parasitic Oscillations" to be used for other purposes. This method is presented in the U.S. Pat. No. 11,374,500B2 and US Publication 20220329172, wherein this publication is a continuation in part.

The EEM, 620, is composed of a unidirectional switch formed by diode, D1, 410, and a controlled switch Sx 4040, and a capacitor Cs, 420, All these three said components are placed in series in any order.

The EPM and EEM modules can operate independently and also together with a certain timing to achieve certain performances. The modules, EPM and EEM can be connected at the terminations of the inductive element, Ln, 140 or can be connected to an auxiliary winding which is coupled with said inductive element Ln, 140, and in such case driving of the switching devices, Sx, 4040 and Sy, 4020, can be done easier specially wherein said switching elements are implemented using silicon Mosfets or GaNs of Sic.

Figure 4A:
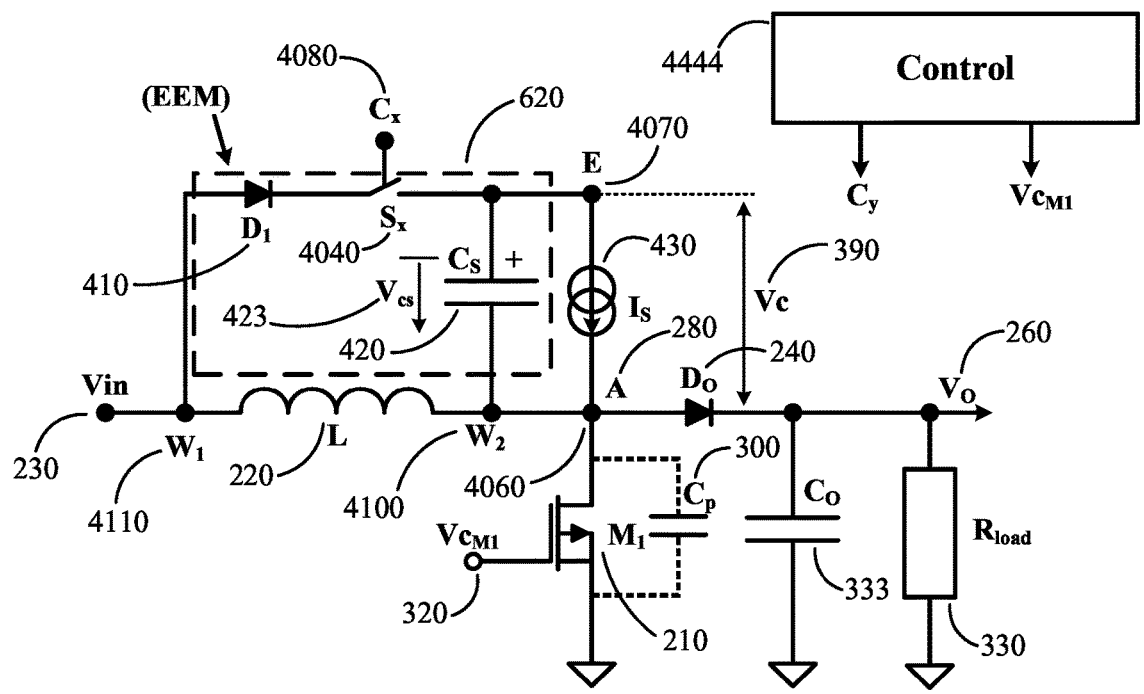
FIG. 4A depicts a boost topology using the clamp from FIG. 1B.

In FIG. 4A is depicted a boost topology formed by an inductive element L, 220, a main switching element M1, 210, a rectifier means, Do, 240, an output capacitor Co, 250 and a load $R_{Load}$, 330. In addition to the boost topology the EEM module is connected between W1, 4110 and W2, 4100, and the VcSx, 222 is connected to the Cx, 4080.

As presented in FIG. 1 the switching node contains a first switch S, 110, a second switch Sn which turns on after the first switch, and after the second switch turns off, the dead time does occur, wherein during the dead time the parasitic oscillations are initiated. The module EPM from presented in FIG. 1B does have a switch Sy, 4020, which is complementary to the first switch.

Figure 4B:
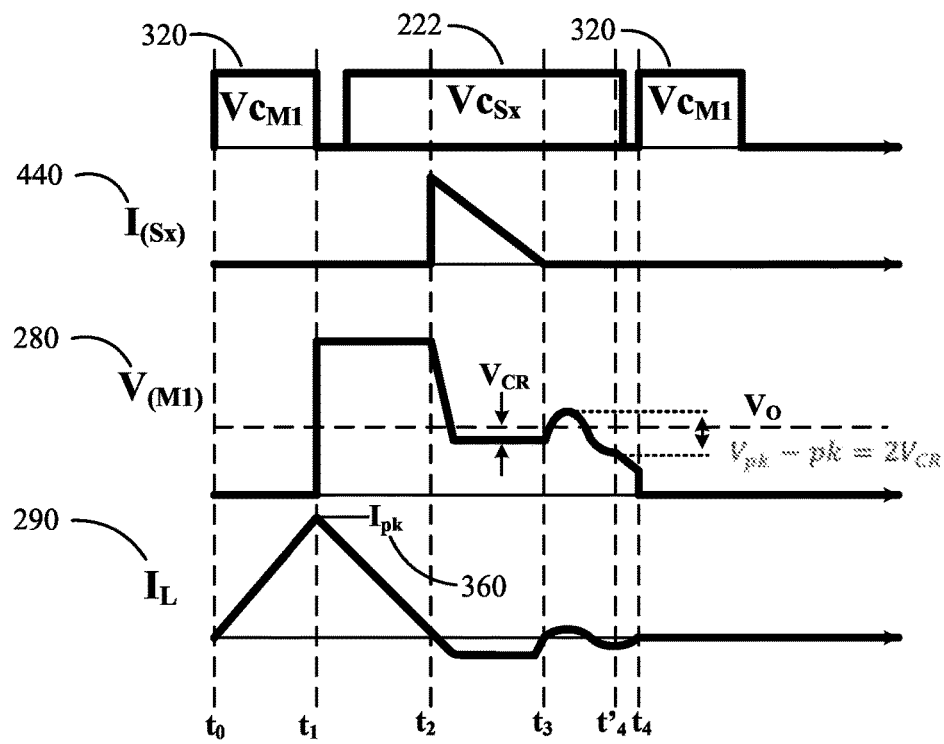
FIG. 4B depicts the key waveforms of the circuit from FIG. 4A.

In the boost topology the first switch is M1, the second switch is Do and the switch Sy of the EPM module is complementary to the first switch. This is depicted in FIG. 4B, by VcM1 and VcSx. In all the topologies we will identify the first and the second switch of the switching node and also we will define the on time for the Sy switch of the EPM by being complementary to the first switch.

The key waveforms of the circuit depicted in FIG. 4A are depicted in FIG. 4B. The key waveforms depicted in FIG. 4B are: VcM1, 320 which is the control signal for M1, VcSx, 222, the control signal for Sx, the current through the auxiliary switch, I(Sx), the voltage across M1, 210, which is also the voltage in the switching node A, 280 and the current through the inductive element IL, 290.

In between t0 to t1, the switch M1, is turned on by the signal VcM1, 320, and during this time the current through L, 220, builds up reaching a peak current Ipk, 360. During this time interval, energy is accumulated in the inductive element L.

At t1, the switch M1, 210, is turned off and the energy stored in between t0 to t1 is delivered to the output load formed by Co, 250 and, $R_{Load}$, 330. In this specification we will define as the output load, the circuit formed by the Co in parallel to Rload. The current through L, 220 will reach zero at t2, which means that all the energy stored in L, 220, is delivered to the output load.

In between t2 to t3, is the period wherein the parasitic energy contained in the parasitic oscillation is extracted and delivered to the storage capacitor Cs, 420. The current though Sx, 4040, reaches zero at t3, which means that the energy of the parasitic oscillation is extracted and stored to Cs, 420.

In between t3 to t4' there is another parasitic oscillation of much lower amplitude and the energy contained is named the residual parasitic oscillation energy. At t4 the main switch M1,210, turns on.

The voltage on Cs, 420 in steady state mode is constant when the average current injected via Sx, 4040, equalizes the average current extracted by Is, 430. The average current injected in Cs, 420, will vary function of the input voltage Vin, 230 the output voltage, Vo, 260. The current source Is, shall be proportionate with the voltage across Cs, 420, in order to reach easily a steady state mode. In this way the circuit formed by Cs, 420, and Is, 430, should act more like an ideal voltage source.

The energy in the residual parasitic ringing is presented in FIG. 4C. That energy is a function of the Vcr. The residual parasitic energy leads to a residual parasitic ringing as depicted in V(M1), 280 from FIG. 5B.

This method of harvesting the energy from the parasitic ringing energy was presented in U.S. Pat. No. 11,374,500 B2.

Figure 5A:
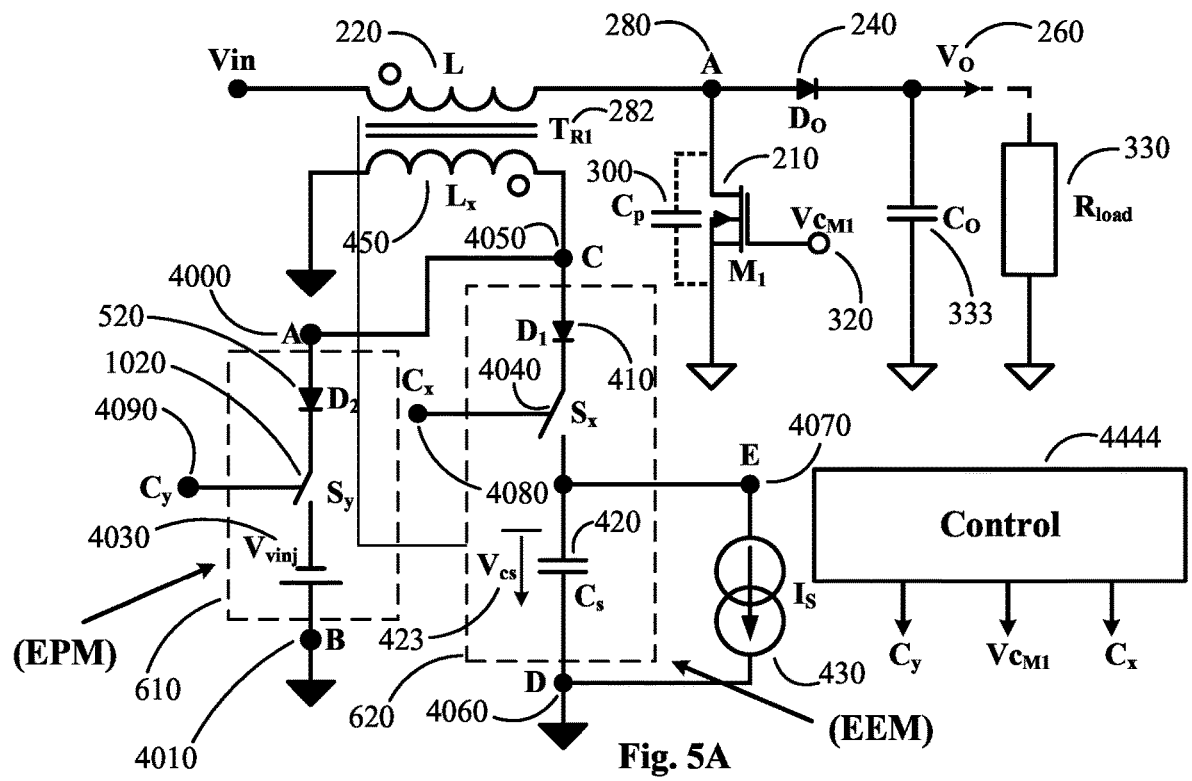
FIG. 5A depicts the boost topology using the EEM and EPM.
Figure 5B:
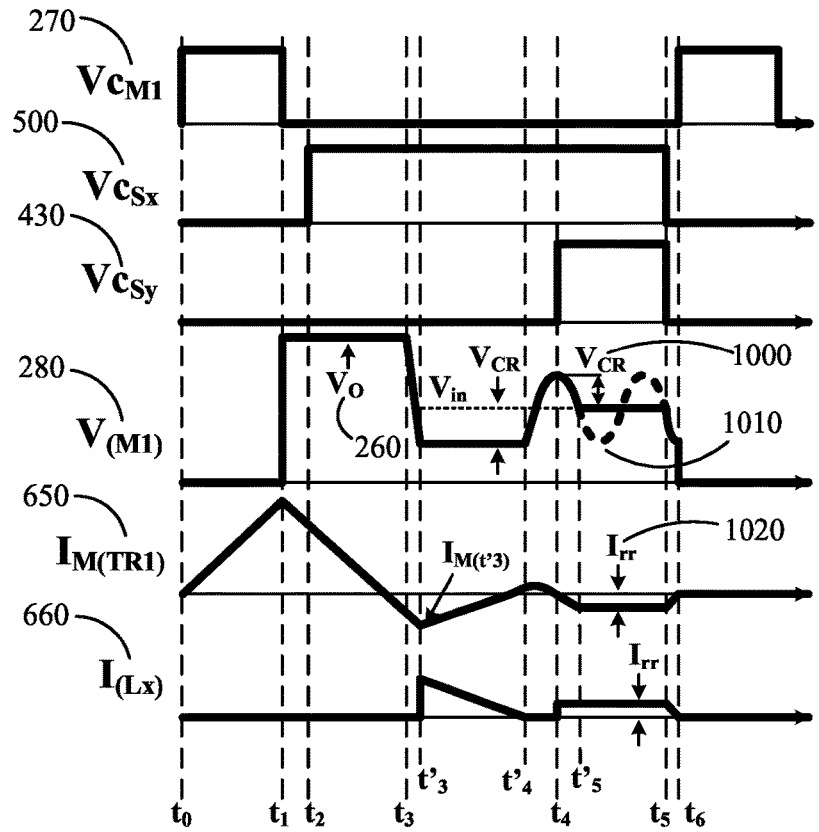
FIG. 5B depicts the key waveforms of the circuit presented in FIG. 5A.

The residual parasitic oscillation are depicted in FIG. 5B by V(M1), 280. We define the first residual parasitic oscillation the oscillation which does occur after t4' when the magnetizing energy of the magnetizing current of $I_M(T_{R1})$ is transferred to the storage capacitor Cs, 420, wherein the voltage across V(M1), 280, crosses the steady state level of the voltage across the main switch V(M1), 280. We define as polarity of the residual oscillation, the polarity reported to the steady state level, in the following way. The oscillation which has the amplitude larger than the steady state level, is considered as positive polarity and if the amplitude of the oscillation is lower than the steady state level is considered negative polarity.

For the most optimized operation of extracting the residual energy is to turn on the switch Sy, from the EPM module during the odd number of residual oscillation such as during the first, third, fifth, residual oscillation.

Positive polarity oscillations the oscillations which are above the steady state level of the voltage across the main switch V(M1), as the ringing 1000, and negative polarity oscillations which are below the steady state level of the voltage across the main switch V(M1), 280, such as the section labeled 1010.

One of the embodiments of this specification is a method of harvesting the residual parasitic oscillation.

To harvest 100% of the residual parasitic energy is done by activating the EPM module, 610, controlled by VcSy, 430 as depicted in FIG. 5B, on the first parasitic oscillation, between t4' and t5'. In FIG. 5B the Sy switch is turned on at t4, which in between t4' and t5'.

Ideally is to turn on Sy, during the first oscillation (t4' to t5') which follows the energy extraction of the parasitic oscillation, which occurs between t3' to t4', such as the time t4. By turning on the Sy, 1020, during the first residual parasitic oscillations, 1000, the magnetizing current Irr,1020 has the polarity, which will discharge the parasitic capacitance Cp, 300, decreasing the voltage across M1, 210, at the time M1, 210 turns on at t5. Without the turn on of the auxiliary switch the residual parasitic oscillation are depicted by the dotted line, 1010.

The turn on of the Sy switch during the first or during the odd number of oscillation of the same polarity as the first parasitic oscillation will ensure that the magnetizing current which will be trapped by short created by Sy and D2 has the proper polarity to discharge the parasitic capacitance Cp, 300. The discharge of the parasitic capacitance will be only to the level of the first residual parasitic oscillation. A further discharge is possible function of the value of the Viinj.

The additional circuit formed by Sy and D2, leads to harvesting the full energy from the residual parasitic oscillation.

In conclusion through the branch formed by D1, Cs and Is, a significant portion of the parasitic oscillation is harvested, there is a residual parasitic oscillation energy which is harvested by the branch formed by the Sy, 1020 and D2, 520. The residual parasitic oscillation energy is converted in a magnetizing current in TR1, In, 1020. Said magnetizing current Irr, 1020 will partially discharge the parasitic capacitance Cp, decreasing the voltage across Cp, at turn on, decreasing in this way the switching losses at turn on for M1, Cp.

In the U.S. Pat. No. 11,374,500 wherein this specification is a continuation in part did not offer a solution for the full harvesting of the parasitic oscillation energy. However, by activating the EPM, the parasitic oscillation energy can be fully utilized.

In one of the embodiments of this specification is extracting the energy stored in Cs, 420 and using that energy for discharging the parasitic capacitance Cs to zero and creating Zero voltage switching conditions for M1, 210.

Figure 6A:
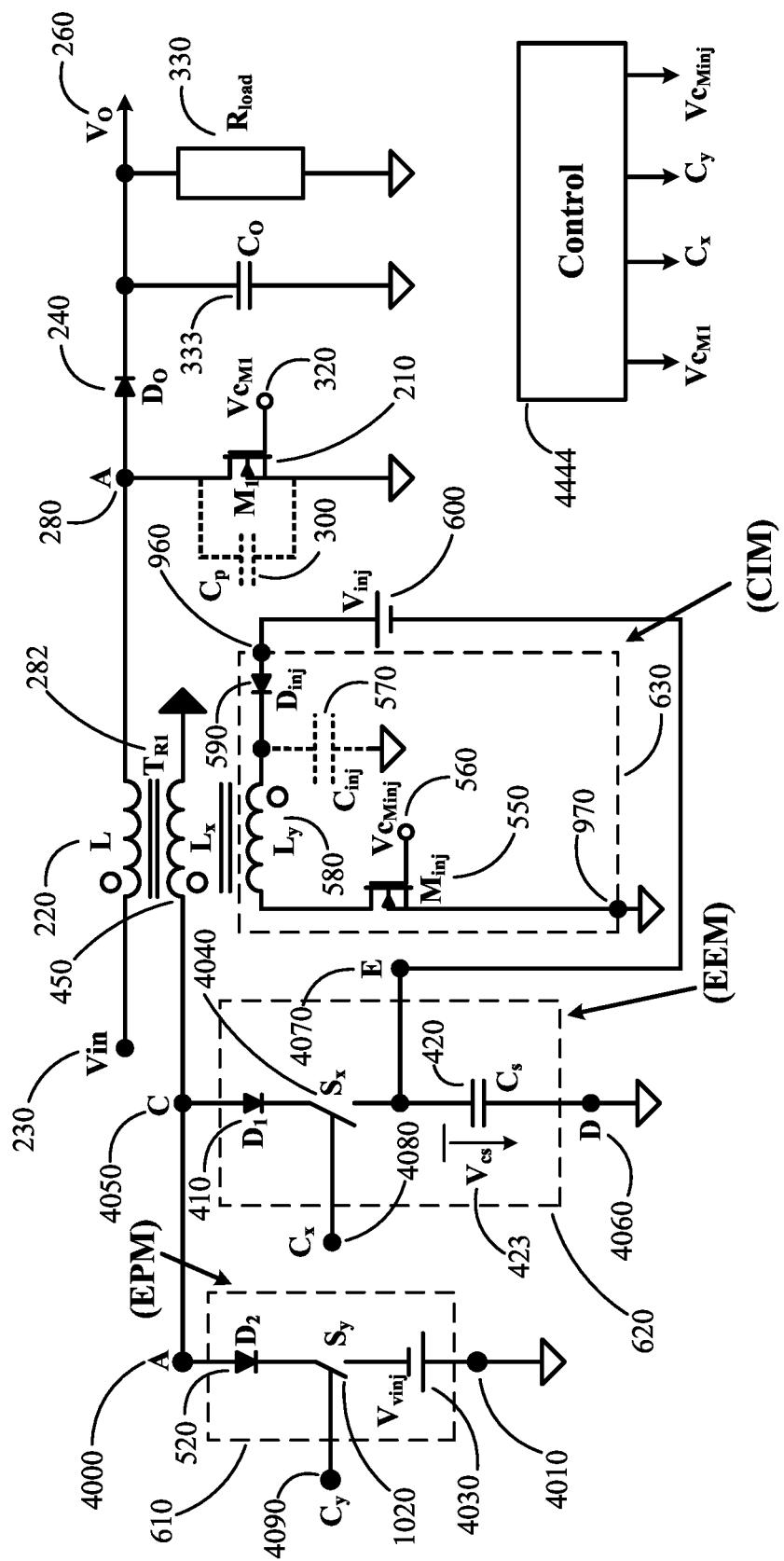
FIG. 6A presents the boost topology using EPM, EEM and CIM via coupled winding with the main inductor.

In FIG. 5A the Is, 430 is presented more as idealized current source. In FIG. 6A is presented the third module which is a preferred implementation of Is, 430.

In FIG. 6A, is depicted the third module, CIM, 630, "Current Injection Module". In this module the energy is extracted from the capacitor Cs, 420, and converted in a pulse of current, which reflects from the winding Ly to winding L, and discharges the parasitic capacitance Cp, 300, prior to the turn on of M1, 210, creating zero voltage switching conditions for M1, 210. This circuit is presented in detail in Jitaru' U.S. Pat. No. 10,574,148 B1 wherein this specification is a continuation in part.

There are applications wherein the energy harvested from the parasitic oscillations may not be enough to create zero voltage switching conditions for M1, 210. In such cases an additional voltage injection voltage source, Vinj, 600 is placed in series with the capacitor Cs, 420. Such an additional voltage source Vinj, can be obtained by using an additional winding in the transformer Tr1, and a rectifier to rectify the voltage and a capacitor to store the rectified energy. The preferred solution is for Vinj to represent the energy harvested from the leakage inductance or from other parasitic elements. Another solution to boost the energy of the current injection in some applications is by using a current injection capacitor Cinj, 570 is placed in between the cathode of the Dinj rectifier and the source of the Minj, 550, as depicted in FIG. 6A. In such implementation a portion of the current injection is extracted from the input voltage Vin, 230, in quasi-resonant forward mode, via the leakage inductance in between the primary winding L, 220 and the current injection winding Ly, 580.

Figure 3A:
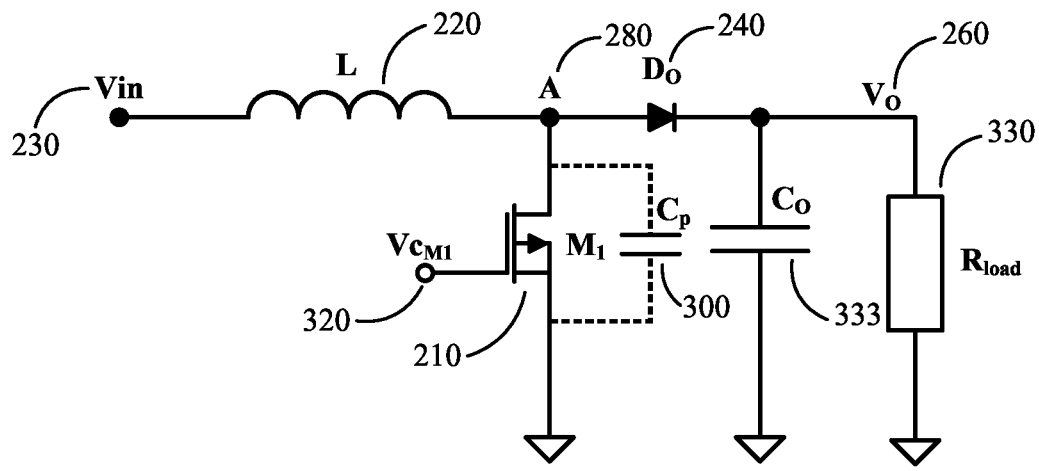
FIG. 3A depicts a conventional boost topology.
Figure 3B:
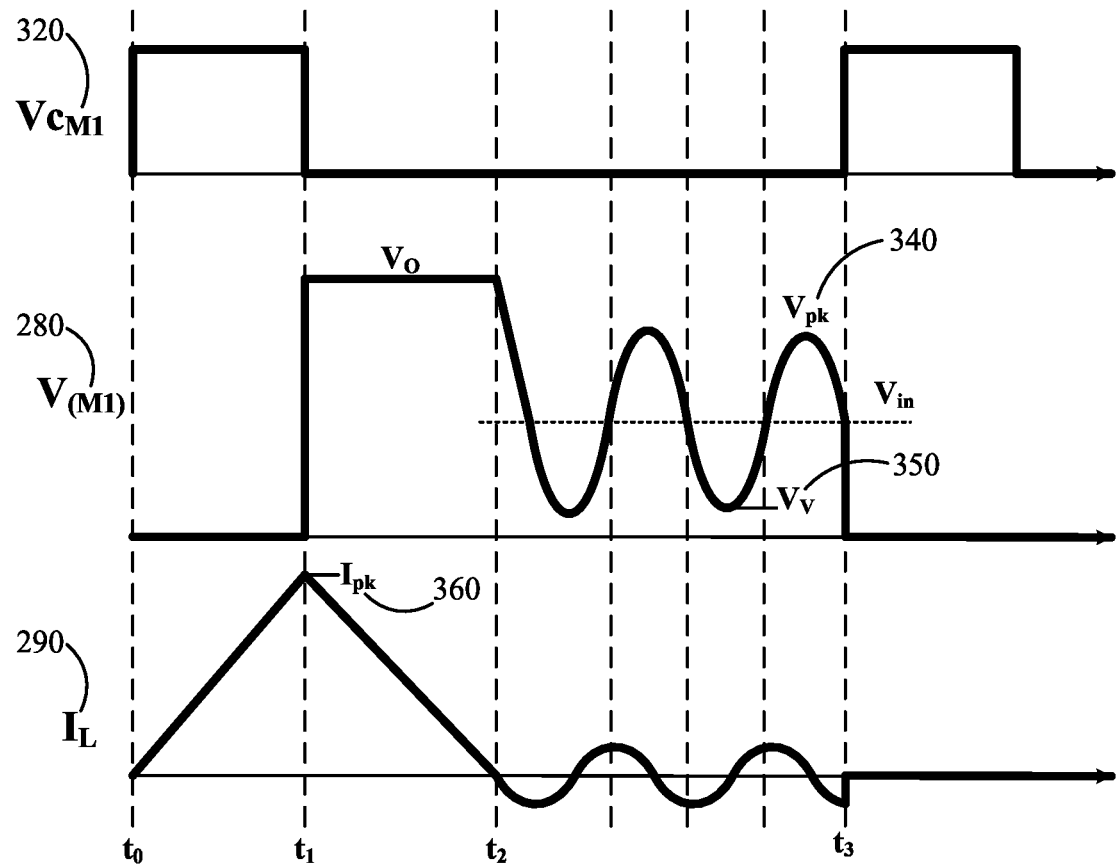
FIG. 3B depicts the key waveforms from the circuit presented in FIG. 3A

In conclusion, in the boost topology the parasitic oscillation energy Wp, depicted in FIG. 3C can be extracted in a significant way by incorporating the EEM, 620, module. The residual energy of the parasitic oscillation which remines after EEM action, which harvest a significant portion of the parasitic oscillation energy and store it in Cs, 420, can be further harvested by the EPM, 610, and store it in the magnetizing energy of the magnetic element L, 220. The two modules EEM and EPM can work together and with the proper timing depicted in FIG. 5B, 100% of the parasitic oscillation energy is harvested. This specification also introduces the CIM, which extracts the energy stored in Cs, and produces a pulse of current via the current injection winding Ly, which reflects in L winding, and discharges the parasitic capacitance Cp, 300, to create zero voltage switching for the main switch M1, 210. The modules EEM and EPM can be placed directly across the inductive element L, 220 or can be placed across auxiliary windings, Lx, as depicted in FIG. 6A. The CIM does require an auxiliary winding such as Ly, coupled with the main inductive element.

Figure 6B:
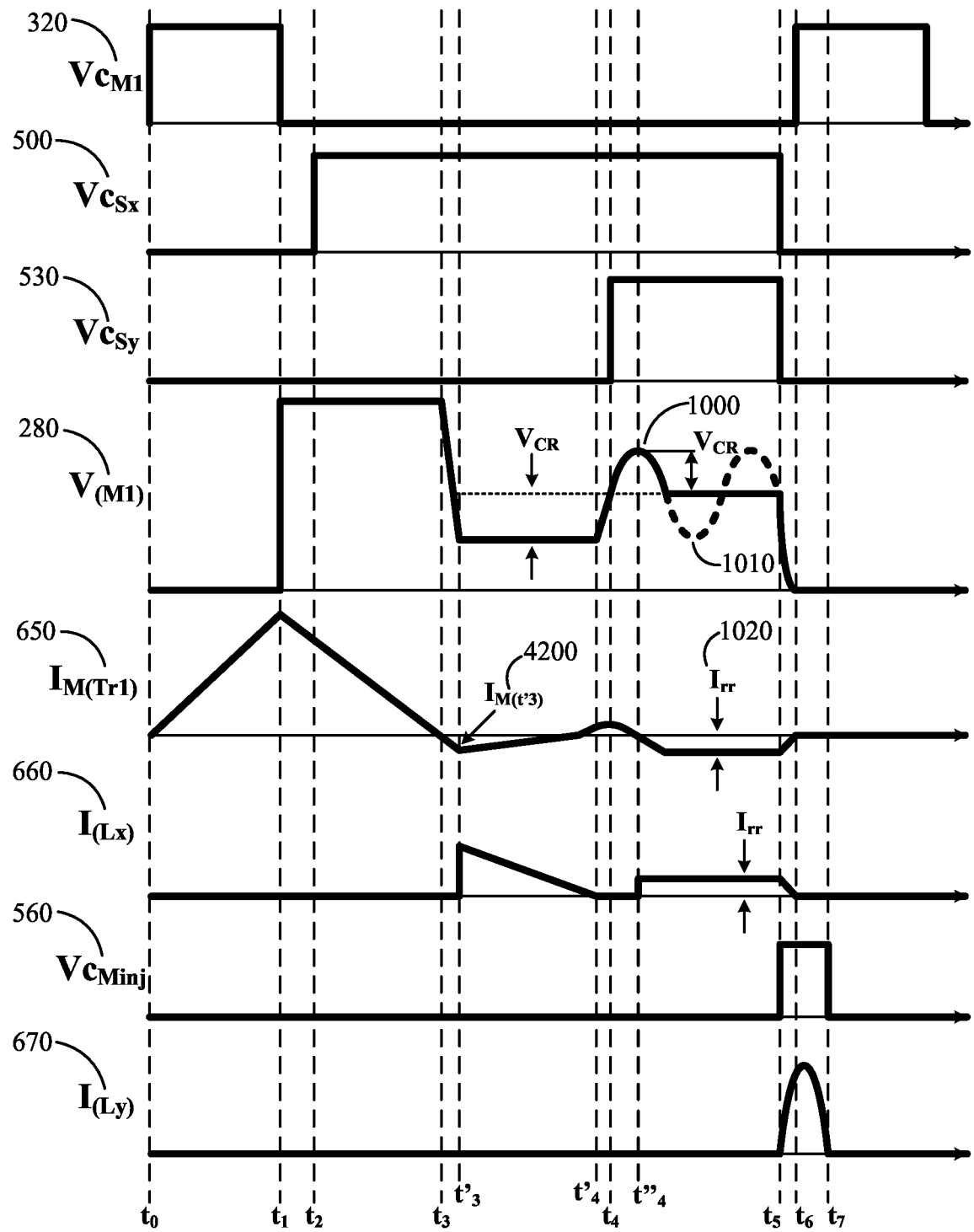
FIG. 6B presents the key waveforms of the circuit from FIG. 6A.

In FIG. 6B are depicted the key waveforms of the circuit presented in FIG. 6A.

Between t0 to t1 the current is flowing only through the winding L of Tr1, 282. At t1 M1, 210, turns off and the current continues to flow through L, Do, 240, towards the output load formed by Co in parallel with $R_{Load}$.

At t2 the switch Sx, 4040 turns on, the control signal for Sx, is complementary to the control signal for M1.

At t3 the current through L, 220, reaches zero which means that the energy stored in L, 220 is transferred to the output load.

Between t3 to t3' the energy contained in the parasitic capacitance Cp, 300, expressed by Wp, the equation from FIG. 3C. is transferred in magnetizing energy by the magnetizing current $I_M(t3')$, 4200, as is also depicted in FIG. 5B.

Between t3' to t4' the magnetizing energy of the magnetizing current of $I_M(T_{R1})$ is transferred to the storage capacitor Cs, 420. The current through the auxiliary winding Lx, 450, of the transformer $T_{R1}$, 282, which conducts the magnetizing current between t3' and t4', decays to zero reaching zero level at t'4. In the transformer Tr1, 282, there is a turn ratio between the winding L, 220 and the auxiliary winding Lx, 450, and that turns ratio is N1. The voltage across Cs, is Vcs, 423. The voltage across Cs, 420, reflects through the transformer $T_{R1}$, 282, wherein $V_{CR}=N1*Vcs$. This can be seen in the V(M1), 280 waveforms.

The energy in the residual parasitic ringing is presented in FIG. 4C. That energy is a function of the $V_{CR}$. The residual parasitic energy leads to a residual parasitic ringing as depicted in V(M1), 280 from FIG. 5B and FIG. 6B.

This method of harvesting the energy from the parasitic ringing energy was presented in the U.S. Pat. No. 11,374, 500 B2 and US Publication 20220329172 A1 wherein this specification is a continuation in part.

The residual parasitic oscillation are depicted in FIG. 6B by V(M1), 280. We define the first residual parasitic oscillation the oscillation which does occur after t4' after the magnetizing energy of the magnetizing current of $I_M(T_{R1})$ is transferred to the storage capacitor Cs, 420, wherein the voltage across V(M1), 280, crosses the steady state level of the voltage across the main switch V(M1), 280, which in this topology is Vin. We define as polarity of the residual oscillation, the polarity reported to the steady state level, in the following way. The oscillation which has an amplitude larger than the steady state level, is considered as positive polarity and if the amplitude of the oscillation is lower than the steady state level is considered negative polarity.

The Switch Sy, 4020 can be turned on anytime between t3' to t4' and create a path for the magnetizing current and keep the amplitude constant or even increase it as per designer's choice, until t5. At t5 said magnetizing current can start discharging the parasitic capacitance Cp, 300, towards zero. For a Vvinj chosen to keep the amplitude of the magnetizing current constant, and for the turn on of Sy at t3' the discharge of Cp, by the magnetizing current will be at the same level as the first valley of the parasitic oscillation if the EEM and EPM modules were not activated. For a larger value of Vvinj, the voltage across the main switch M1, can reach zero. In such a mode of operation the EEM does not harvest a significant energy from the parasitic oscillation in order to charge the capacitor Cs, 420. By turning on the switch Sy, in between t3 to t4, both modules will extract energy form the parasitic oscillation in a ratio which is function of the time wherein Sy is turned on. If Sy is turned on at t3' the EPM module extracts the full parasitic oscillation and store it in the magnetizing current of the transformer Tr1, 282. If The switch Sy is turned on after t4' a significant portion of the parasitic oscillation is stored in Cs, 420 and the residual parasitic oscillation will be stored in the magnetizing current of Tr1, 282, After t4' the residual parasitic oscillation energy can be harvested in optimally into the magnetizing current if the turn on on the switch Sy, 4020 from the EPM module is done during the first residual oscillation or during the odd number of residual oscillation which have the same polarity as the first oscillation. In such case the magnetizing current harvested by the EPM has the polarity necessary to discharge the Cp, 300. The value of the Vvinj will modulate the amplitude of the magnetizing current Irr, 1020, as needed.

At t5, the current injection switch Minj of the CIM is turned on. A pulse of current is injected in the winding Ly, 580, current which will reflect into the primary winding and discharge the parasitic capacitance Cp, 300 towards zero. The energy contained in Cs, may not be enough to power the necessary current injection amplitude to fully discharge Cp, and in such application a voltage injection Vinj, is placed in series with Cs.

The magnetizing current Irr, 1020, will do some of the discharge and the current injection will follow.

The three modules, EPM, EEM and CIP offer a a significant flexibility to the designer of how to harvest the parasitic oscillation, how to store it such as electric energy in the charge of Cs, or the magnetic energy of the amplitude of the magnetizing current such as Irr, and also of using other energy sources such as Vvinj to modulate the magnetizing current or Vinj, to modulate the current injection.

The additional voltage sources can be obtained from the transformer Tr1, 450 via auxiliary winding or partial winding and rectifiers to produce the necessary amplitude for Vvinj and Vinj.

One of the embodiments of this specification is a method of harvesting the residual parasitic oscillation.

To harvest 100% of the residual parasitic energy is done by activating the EPM module, 610, controlled by VcSy, 430 as depicted in FIG. 5B, on the first parasitic oscillation, between t4' and t5'. In FIG. 5B the Sy switch is turned on at t4, which is in between t4' and t5'.

Ideally is to turn on Sy, during the first oscillation which follows the energy extraction of the parasitic oscillation, which occurs between t3' to t4', such as the time t4. By turning on the Sy, 1020, during the first residual parasitic oscillations, 1000, the magnetizing current Irr,1020 has the amplitude and the polarity, which will discharge the parasitic capacitance Cp, 300, decreasing the voltage across M1, 210, at the time M1, 210 turns on at t6. Without the turn on of the auxiliary switch the residual parasitic oscillation are depicted by the dotted line, 1010.

The turn on of the Sy switch during the first or during the odd oscillation of the same polarity as the first parasitic oscillation will ensure that the magnetizing current which will be trapped by short created by Sy and D2 has the proper polarity to discharge the parasitic capacitance Cp, 300. The discharge of the parasitic capacitance will be only to the level of the first residual parasitic oscillation. A further discharge is possible function of the value of the Vinj.

Figure 7A:
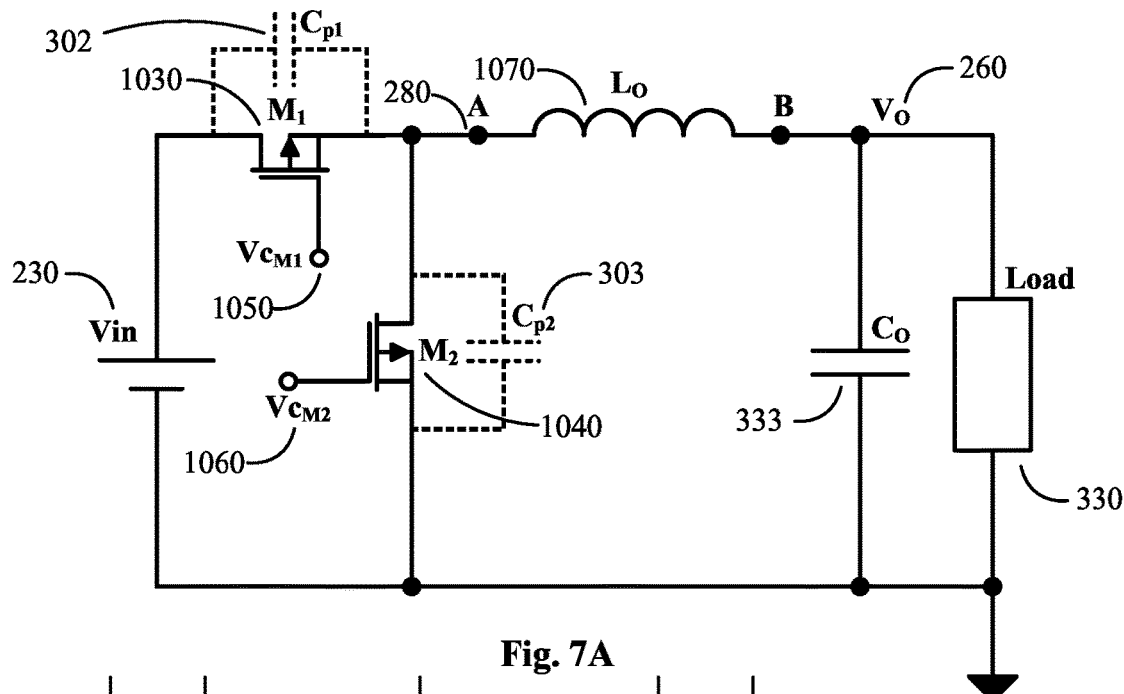
FIG. 7A presents the circuit of a buck topology.

The parasitic oscillations do occur also to other topologies such as buck topology. In FIG. 7A is presented the buck topology and in FIG. 7B are presented the key waveforms associated with the buck topology from FIG. 7A.

Figure 7B:
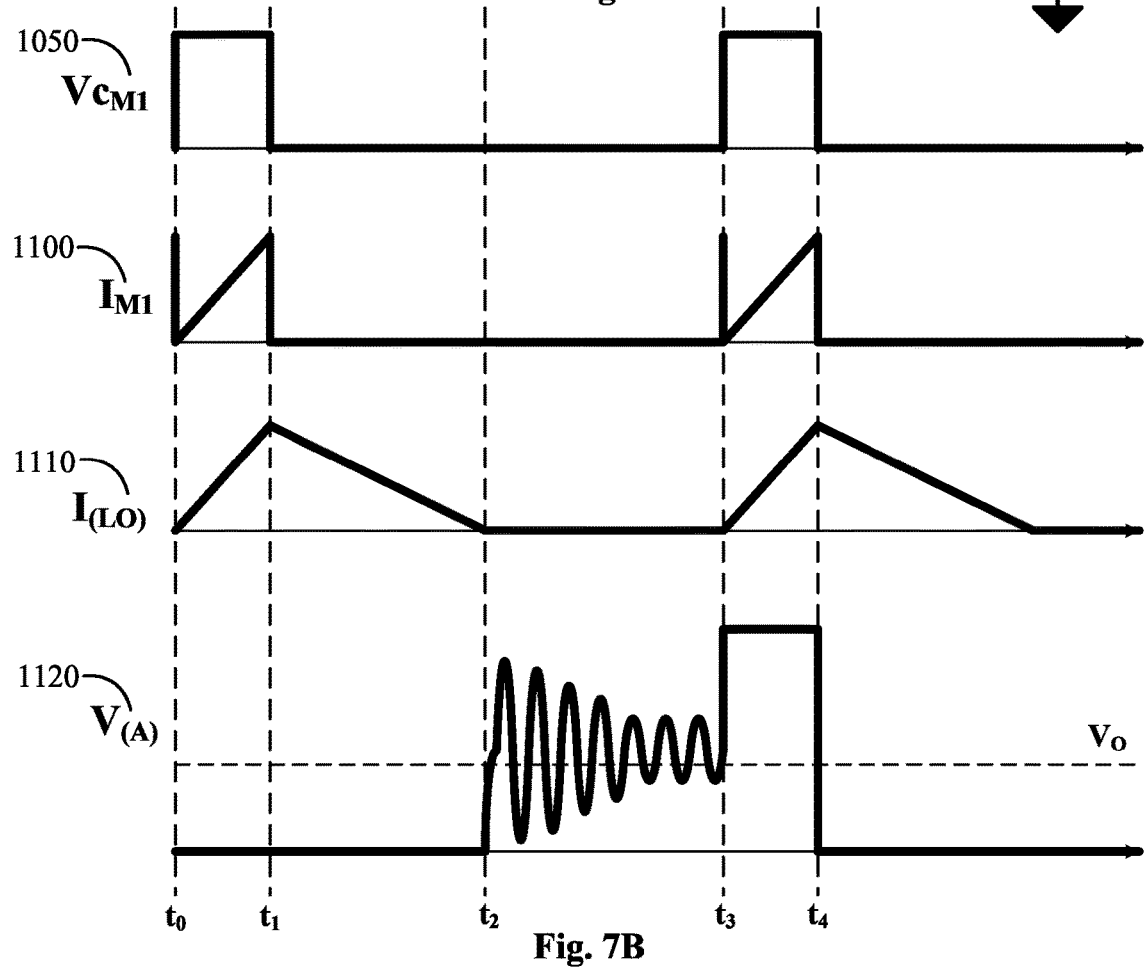
FIG. 7B presents the key waveforms of the circuit from FIG. 7A.

The key waveforms depicted in FIG. 7B are: the control signal for M1, VcM1, 1050, the current through M1, IM1, 1100, the current through Lo, I(Lo), 1110, and the voltage in the switching node A, V(A), 1120.

Between t0 to t1 the switch M1, 1030, turns on and during this time interval the current builds up through M1, from zero to a peak current. As visible in FIG. 7B there is a spike of current which occurs at the turn on of M1, due to the discharge of the parasitic capacitance Cp, reflected across M1, 1030 in hard switching mode.

Between t1 to t2 the current through Lo, 1070, decreases with a slope proportionate to Vo/Lo At t2 the current through Lo reaches zero which means that the energy injected in the magnetizing current of Lo is fully transferred to the load. I am defining as a load the output configuration connected to Vo, composed by the output capacitor Co, 333 and output load, 330.

The time in between t2 to t3 is referred in the field as the dead time, time wherein neither of the switching elements, M1, 1030 and M2, 1040 is on. During the dead time the voltage in A exhibits parasitic oscillation caused by the resonant circuit formed by the inductive element, Lo, 1070 and the parasitic capacitors across M1 and M2 which are in parallel. The parasitic oscillations are energized by $W_{pBuck}$, which is depicted in FIG. 7C.

Figure 8A:
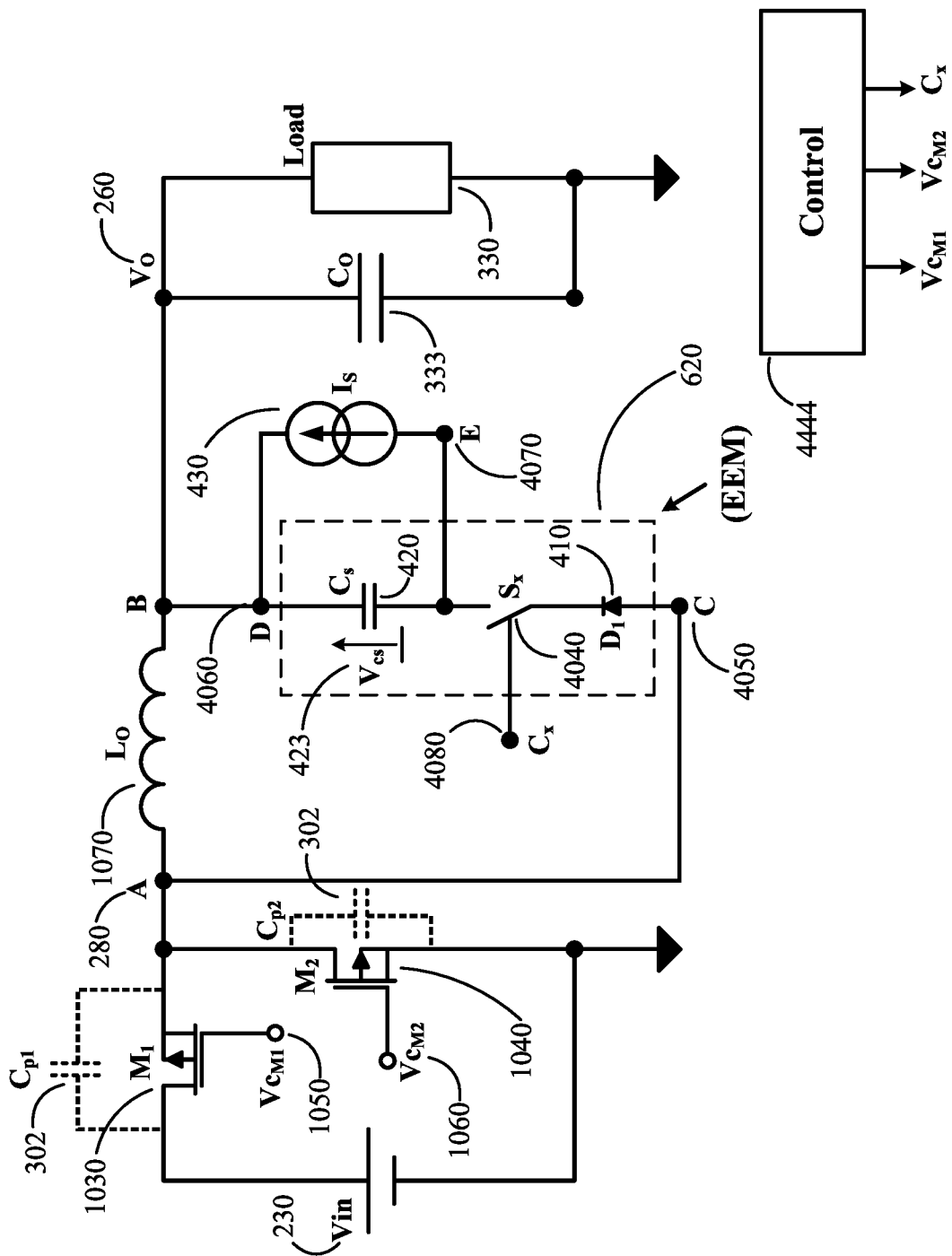
FIG. 8A presents the buck topology using the EEM from FIG. 1C.

In FIG. 8A is presented a solution to harvest the energy from the parasitic oscillations circuit which harvests the energy from the parasitic oscillation depicted in FIG. 7B, in between t2 and t3. The module EEM is placed across the output inductor Lo, as depicted in FIG. 8A. The current source Is, 430 has the role of absorbing the energy form the parasitic oscillation, which is injected in Cs, 420. Is a symbolic representation of the circuitry which absorb the energy stored in Cs, 420 and use it for some purposes such as, bias power, other applications or the current injection which has the purpose of discharging the parasitic capacitance reflected across M1 prior M1 will turn on.

Figure 8B:
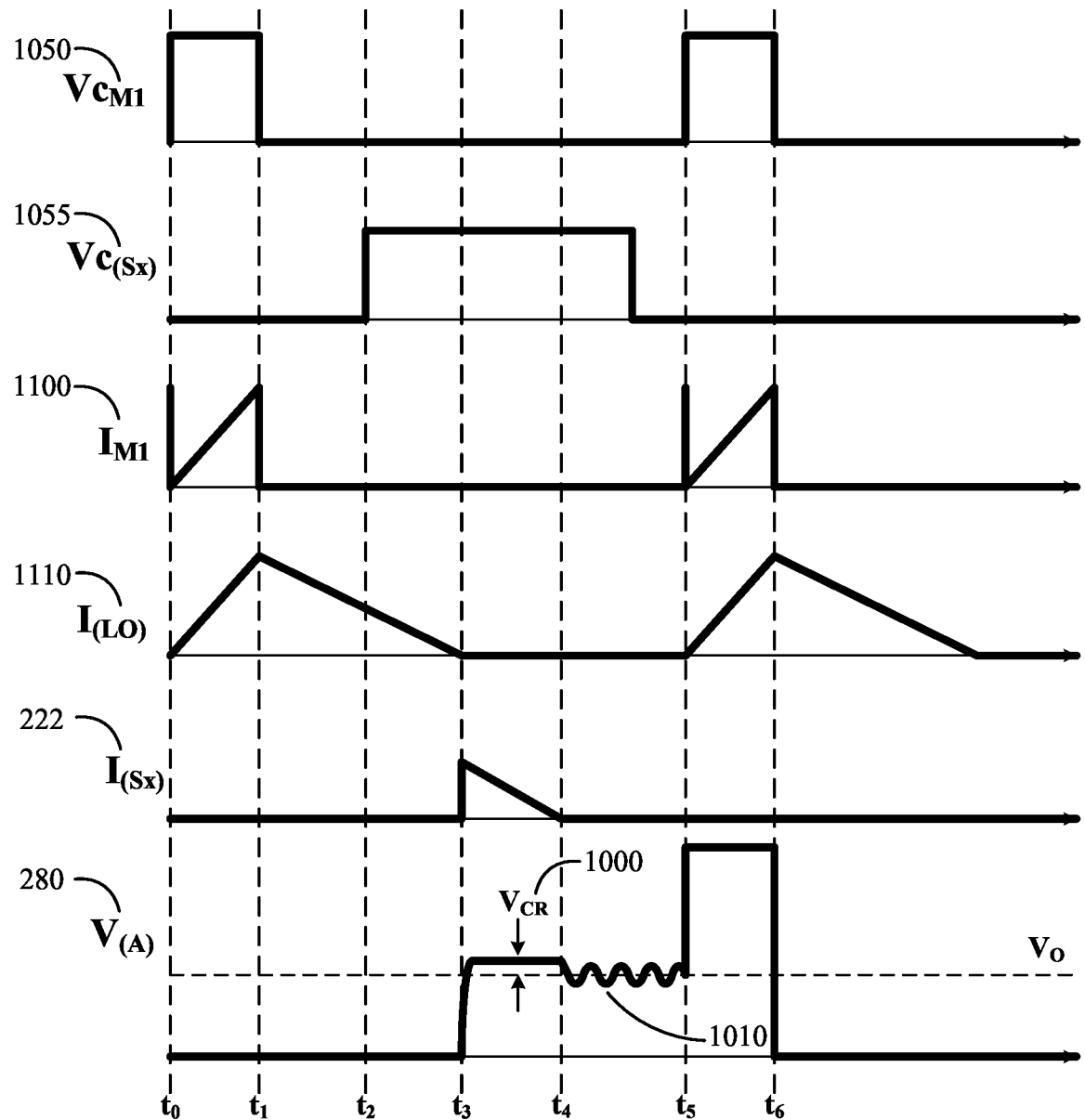
FIG. 8B presents the key waveforms of the circuit from FIG. 8A.

In FIG. 8B are depicted the following key waveforms of the circuit presented in FIG. 8A. The key waveforms are: VcM1, which is the control signal for M1, Vc(Sx), which is the control signal for Sx, from the EEM module, the current through M1, I(M1), the current through Lo, I (Lo), the current through the Sx, I(Sx) from the EEM module, and the voltage in the switching node A, 280.

In between t0 to t1, M1 is turned on and the current builds up through Lo, with a slope (Vin−Vo)/Lo.

At t1 the mean switch M1, 1030, turns off, and the current through Lo starts decreasing with a slope Vo/L.

At t2 the switch Sx,4040, from the EEM module, turns on with the purpose to be on prior the current through Lo reaches zero.

At t4 a significant portion of the parasitic oscillation energy is transferred into Cs, 420, via the current through Sx, 4040. The current through Sx, 4040 starts flowing after the current through Lo, reaches zero and the voltage in the switching node, A, starts to build up to the level Vo+$V_{CR}$.

Between t4 to t5 the voltage in switching node A, does exhibits oscillation called residual parasitic oscillations wherein the peak-to-peak amplitude is 2*$V_{CR}$. A significant portion of the parasitic oscillation energy was harvested in between t3 to t4 and stored in Cs. The energy in the residual parasitic oscillation is depicted in FIG. 8C. For extracting 100% of the parasitic oscillation a second module, EPM, has to be added as is depicted in FIG. 9A.

Figure 9A:
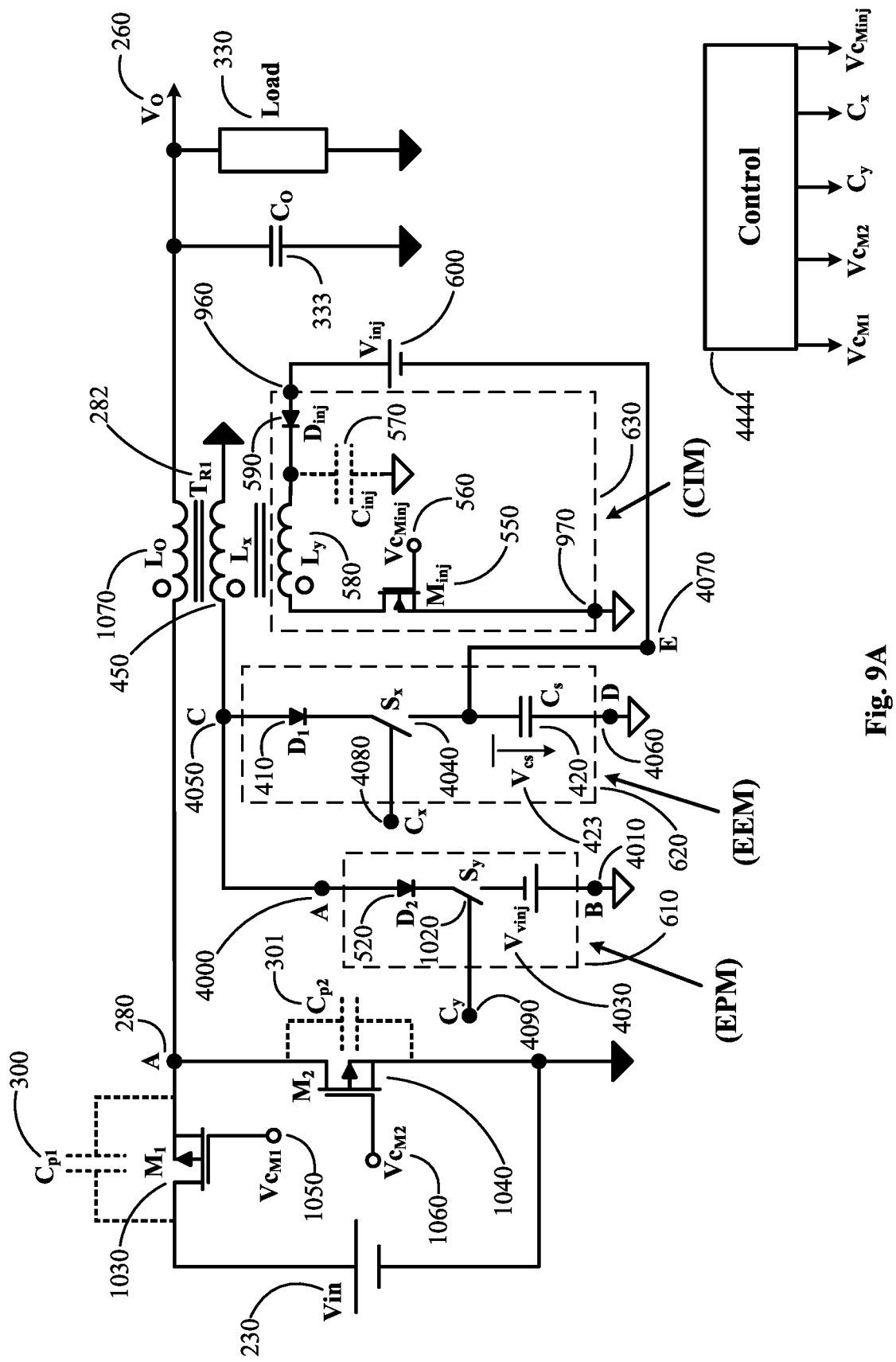
FIG. 9A presents the buck topology using the EPM, EEM and CIM placed on the auxiliary winding of the main inductor Lo.

In FIG. 9A is presented a buck topology wherein the EPM, EEM and CIM are utilized. The EPM and EEM are connected across an auxiliary winding of the Tr1, 282, which contains Lo as the primary winding. The EPM and EEM modules are connected across the winding Lx. The said modules, can be also connected across Lo, but the connection across an auxiliary winding is an embodiment of this specification, wherein the driving of the Sy and Sx can be easily done from the ground level in case wherein the switcher Sy and Sx, are implemented by using silicon Mosfets, or GaNs or SiC. The current injection circuit, 630, is connected to the auxiliary winding Ly, named also the current injection winding.

The first embodiment is the use of two modules, EEM, and CIM. In this embodiment a significant portion of the parasitic oscillation energy is extracted and stored in Cs, 420. The energy stored in Cs, 420, will be further utilized by the CIM module in order to produce a pulse of current which will reflect from the current injection winding, Ly, to the Lo winding and discharge the parasitic capacitance reflected across M1, towards zero.

The second embodiment of this specification is the use of all three modules, EEM, EPM and CIM and in this embodiment 100% of the parasitic oscillations will be extracted.

Figure 9B:
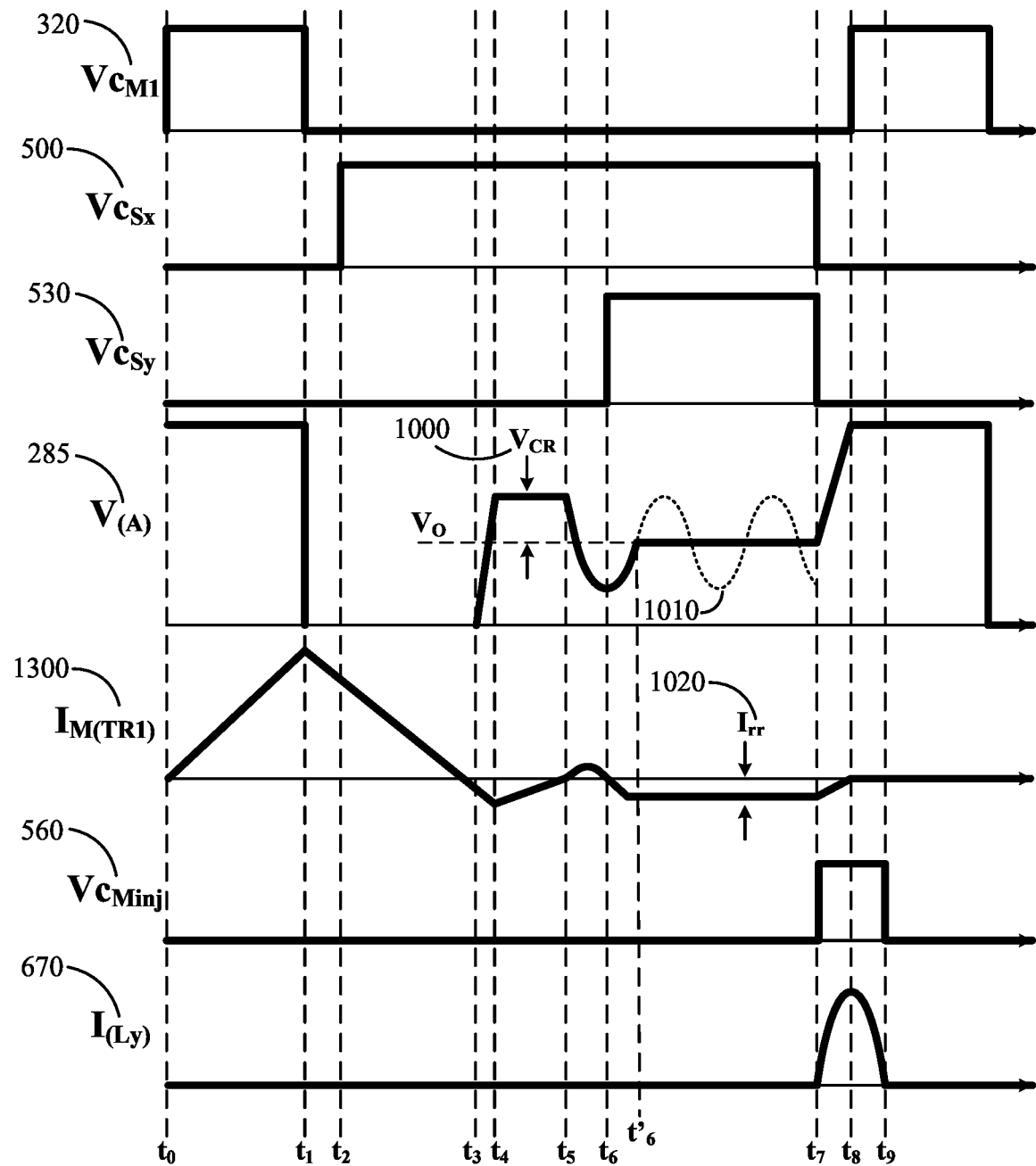
FIG. 9B presents the key waveforms of the circuit from FIG. 9A.

The key waveforms of the circuit presented in FIG. 9A are depicted also in FIG. 9B.

In FIG. 9B are depicted the following waveforms:

$V_{cM1}$, the control signal for M1; $V_{cSx}$, is the control signal for Sx, 4040; $V_{CSy}$ is the control signal for Sy, 4020 from the module EPM, the voltage in the switching node A, V(A), 285, the magnetizing current for Tr1, IM(TR1) 1300, the control signal for the Minj, $V_{cMinj}$, 560 and the current injection through Ly, I (Ly).

Between t0 to t1 the main switch M1, 1030, is turned on and the current starts building up through the inductor element Lo, with a slop proportional to (Vin−Vo)/$L_{Lo}$, wherein $L_{Lo}$ represents the inductance of Lo.

At t2 the Sx switch of the EEM module is turned on.

At t1 the main switch M1, turns off and the current through Lo continues to flow via M2, 1040, Lo towards the output load. At t3 the current flowing through Lo, reaches zero, which means that the energy stored in Lo, during the interval t0 to t1 is fully transferred to the output load.

After t3, the inductive element Lo and the parasitic capacitance reflected in the switching node A form a resonant circuit powered up by the output voltage. Without the presence of the module EEM the voltage in A would swing to an amplitude of 2*Vo. Because Sx, 4040 was already closed at t2, the voltage swing in A si limited to Vo+$V_{CR}$, wherein $V_{CR}$ is the voltage across Cs, reflected in the primary winding Lo. The turns ration between the primary winding Lo, and Lx is Nx. The voltage reflected into the primary winding Lo, of the transformer TR1, 282, is Nx*$V_{CS}$. The voltage in the switching node A, in between t4 to t5 is Vo+$V_{CR}$. The magnetizing current reflected into Lx, will start charging the Cs, 420, between t4 to t5 when the magnetizing current IM(TR1) reaches zero.

Starting at t5, a residual parasitic oscillation starts developing in the switching node A, due to the resonant circuit formed by Lo and the parasitic capacitance reflected in A. The residual parasitic oscillation is energized by the energy in the parasitic capacitor reflected in the switching node A, by the voltage Vcr.

In the first embodiment, only the EEM and CIM modules are utilized and in such case the voltage in A, in between t5 to t7 is described by the dotted line 1010, which is the residual parasitic oscillation.

In the second embodiment the module EPM is also connected across Lx winding as depicted in FIG. 9A. The switch Sy, 4020 is turned on at t6 as depicted in FIG. 9B. The unidirectional switch formed by D2, 520 and Sy, will create a path for the magnetizing current Irr to flow. The Vvinj will add additional energy to keep the Irr to a given amplitude. In many of the applications the Vvinj is chosen to keep the amplitude of Irr during t6' a d t7 at a constant amplitude.

At t7 both switchers Sx, 4040 and Sy are turn off and the magnetizing current Irr will start discharging the parasitic capacitance reflected in the switching node A. The discharge of the parasitic capacitance will have an amplitude smaller than $V_{CR}$.

At t7 the switch Minj, 550 of the CIM module will turn on. A pulse of current will develop via Ly, 580, using the energy stored in the capacitor Cs, which was charged in between t4 to t5. The pulse of current flowing through Ly will reflect in the primary winding Lo of Tr1 and start discharging the parasitic capacitance reflected across M1, towards zero. In some applications a voltage source Vinj,600 may be added in order increase the amplitude of the current injection and ensure that the voltage across M1, is zero before t8 when the main switch is turned on by $V_{cM1}$.

In conclusion for the Buck topology, we have two embodiments.

The second embodiment is the use of the EEM module, 620 and place it across the inductor element Lo or across an auxiliary winding coupled with the inductor element as depicted in FIG. 9A. In this second embodiment the energy contained in the parasitic oscillations is partially extracted and stored in the storage capacitor Cs, 420. Further after Sx, 4040 is turned off the CIM module is activated and a pulse of current will be generated in the auxiliary winding of the Tr1, 282, said current which will reflects into the primary winding Lo, of Tr1, discharging the parasitic capacitance reflected across M1 to create zero voltage switching conditions. In some applications of this embodiment an external voltage source Vinj, 600, is placed in between Cs, 420 of EEM and the Dinj 590 of CIM, said voltage source Vinj, will ensure that the current injection pulse has the necessary energy to discharge the parasitic capacitance reflected across M1. The current injection pulse may be activated after the Sx and Sy switchers are off. This delay is function of the application for optimization.

The second embodiment consists in the use of all three modules, EPM, EEM and CIM. In this embodiment, the switch Sy, 4020, can be turned on during the time Sx, 4040 is on and in that case the parasitic oscillation energy is split into charging the Cs, 420 and in the magnetizing current of Lo or TR1, function of the implementation. In another operation mode the Sy will be turned on after Sx turns off. In this way a significant portion of the energy contained in the parasitic oscillation will be stored in Cs, 420, and the remaining energy referred to as residual parasitic energy would be stored in the magnetizing current of Lo, to Tr1. After both switchers, Sx, 4040 and Sy, 4020 turn off, the parasitic capacitance reflected across M1, start to be discharged through the magnetizing current which is energized by the residual parasitic energy and also by the current pulse generated by the CIM using the energy stored in Cs, 420 and also by the energy injected by Vinj, 600. These embodiments offer a very large degree of flexibility to the designer, in order to optimize their application.

Figure 10A:
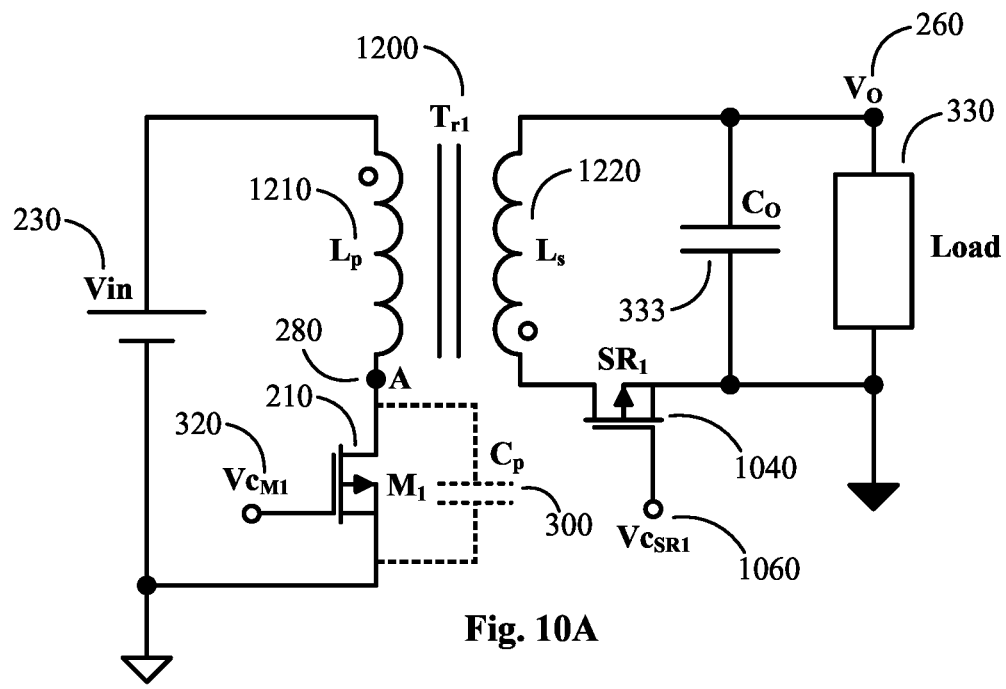
FIG. 10A presents the flyback topology.

Parasitic oscillations do occur also to other topologies such as isolated topologies such as Flyback topology. In FIG. 10A is presented an isolated flyback topology. An isolated flyback topology has a primary and a secondary. In the primary section there is an input voltage source, Vin, 230, a transformer Tr1, 1200 having a primary winding Lp, 1210 and a secondary winding Ls, 1220, and a primary switch M1, 210. The secondary circuit contains a secondary switch SR1, 1040 and the output stage composed by an output capacitor Co, 333 in parallel with an output load, $R_{Load}$,330.

Figure 10B:
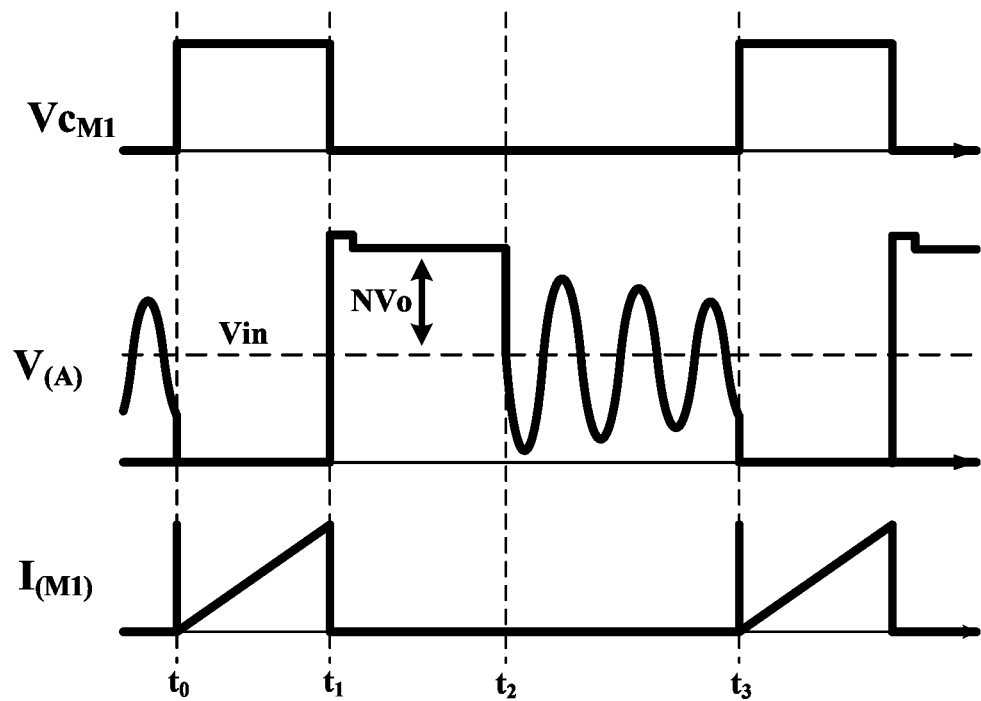
FIG. 10B depicts the key waveforms of the circuit from FIG. 10A.

The key waveforms of the flyback topology presented in FIG. 10A, are depicted in FIG. 10B.

In between t0 to t1 the primary switch M1, 210 is turned on and the current builds up through the primary winding storing energy in the magnetizing inductance of the transformer Tr1, 1200.

At t1 the primary switch M1, turns off and the magnetizing current will reflect from the primary winding to the secondary winding via switch SR1.

At t2 the current through the secondary winding reaches zero, which means that the energy stored in the transformer Tr1, 1200 during t0 to t1 was fully delivered to the secondary between t1 to t2.

The time interval between t2 to t3, wherein primary and secondary switchers are off is named the dead time. During this period parasitic oscillations do occur in the switching node, A, 280. These parasitic oscillations are caused the resonant circuit formed by the primary winding, 1210 and the parasitic capacitance reflected across M1, Cp, 300, and energized by the $Wp_{Flyback}$, depicted in FIG. 10C, wherein N is the turn ratio between primary and secondary.

Figure 11A:
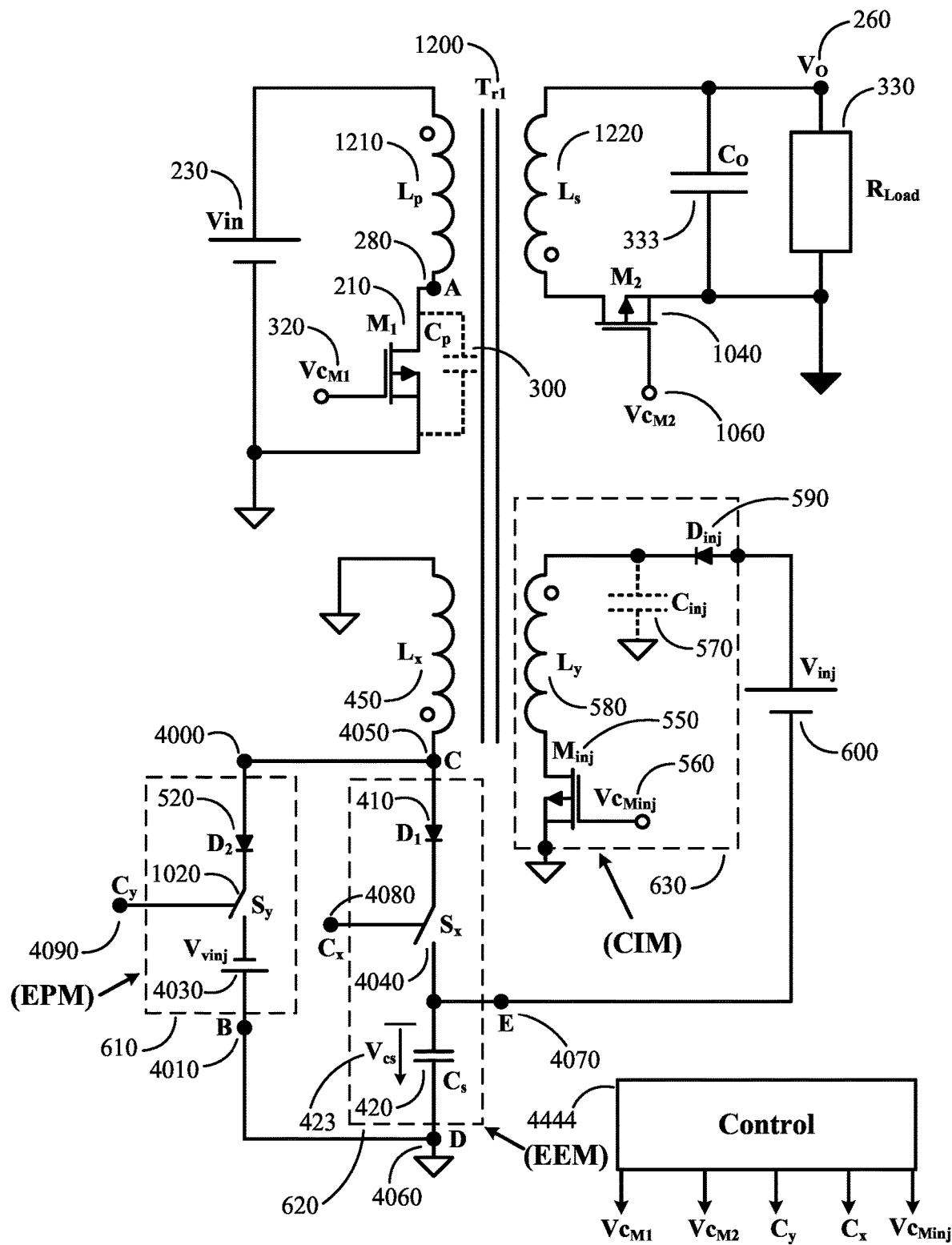
FIG. 11A presents the flyback topology using EPM, EEM and CIM placed on the auxiliary windings.

In FIG. 11A is presented a flyback topology wherein several modules are added. The first module is the "energy extraction of the parasitic energy module", EEM, 620. It is formed by the switch Sx, 4040, diode D1, 410 and the energy storage capacitor Cs, 420. As previously presented the role of this module is to extract a significant portion of the energy contained in the parasitic oscillation's and to store it in the capacitor Cs, 420.

The second module presented in FIG. 11A is the "Energy Preservation Module", EPM, 610, formed by the switch Sy, 1020, a diode D2, 520 and a voltage source Vvinj. As previously presented, the role of the module to extract the residual parasitic oscillation energy and preserve it in the magnetic energy via the magnetizing current. This residual energy extracted by the EPM module is stored in the magnetizing current of transformer Tr1, 1200.

The third module presented in FIG. 11A is the "current injection module", CIM, 630, formed by the switch Minj, 550, the control signal for the current injection, VcMinj, 560, the current injection winding Ly, 580, which is coupled with the primary winding Lp, 1210 and the secondary winding 1220. There is an additional current injection diode, Dinj and an optional current injection capacitor, Cinj. The energy for the current injection winding is provided by the energy storage capacitor, Cs, 420, from module 620. In some applications an additional voltage source, Vinj, 600 is added to ensure that the current injection circuit has the necessary energy to discharge the parasitic capacitance, Cp, 300, reflected across the main switch, M1, 210.

Figure 11B:
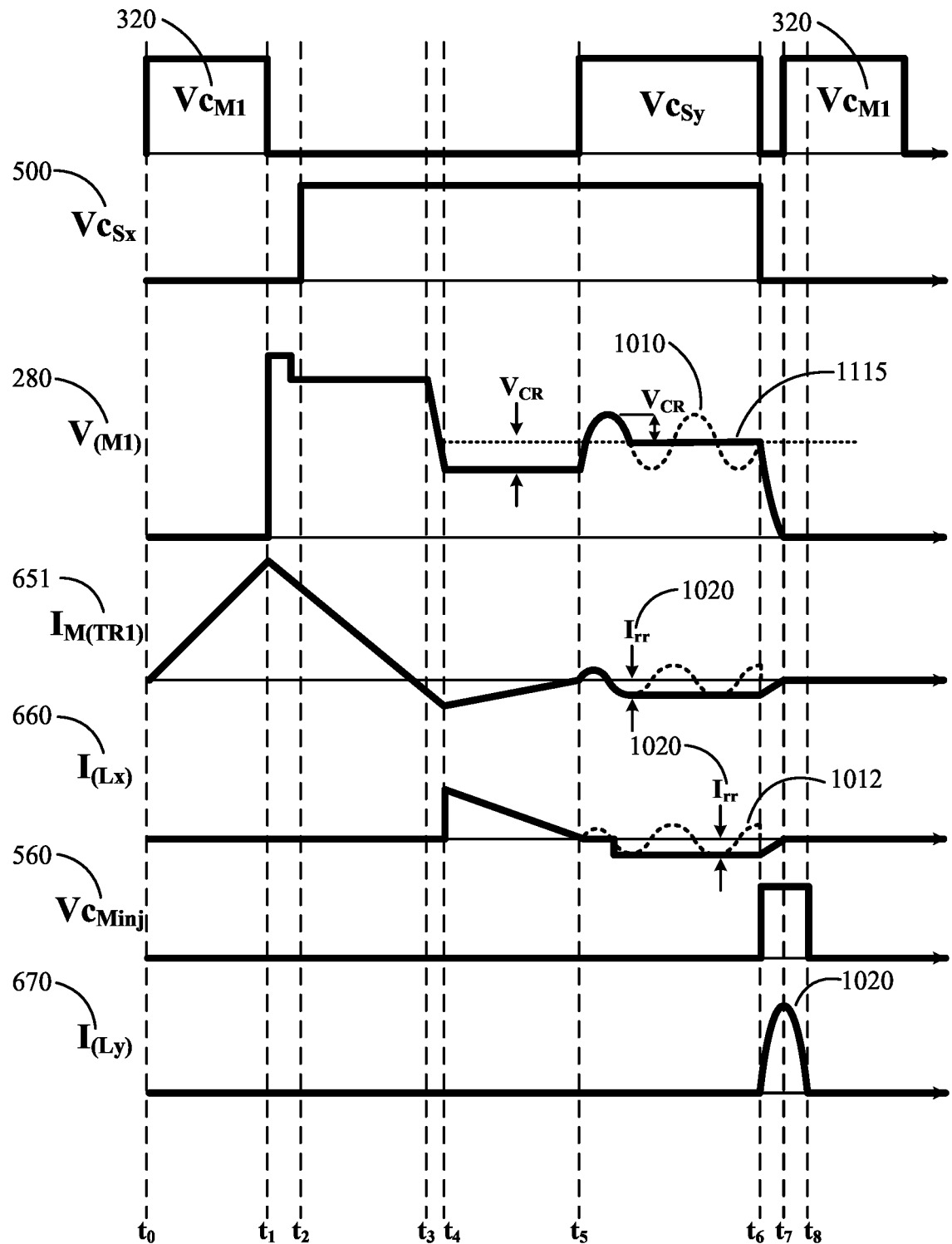
FIG. 11B presents the key waveforms of the circuit of FIG. 11A.

In FIG. 11B are depicted the key waveforms for the circuit from FIG. 11A wherein all three modules, EPM, EEM and CIM are used.

As presented in FIG. 1 the switching node contains a first switch S, 110, a second switch Sn which turns on after the first switch, and after the second switch turns off, the dead time does occur, wherein during the dead time the parasitic oscillations are initiated. The module EPM from presented in FIG. 1B does have a switch Sy, 4020, which is complementary to the first switch.

In the flyback topology the first switch is M1, the second switch is M2 and the swith Sy of the EPM module is complementary to the first switch. This is depicted in FIG. 11B, by VcM1 and VcSx.

In FIG. 11B are depicted the key waveforms for the circuit from FIG. 11A wherein all three modules are used, the "energy preservation module", EPM the "energy extraction of the parasitic energy module" EEM together with the "current injection module" CIM. The key waveforms presented in FIG. 11D are: the control signal on the main switch M1, $V_{cM1}$, 320, the control signal of the Sx switch, VcSx, 500, the voltage across the main switch, V(M1), 280, the magnetizing current $I_M$(Tr1) through the transformer Tr1, 1200, the current through the winding Lx of the transformer Tr1, I(Lx), 660 the control signal for the Minj, Vc(Minj), 560, and the current injection flowing through Ly winding of Tr1, I(Ly), 670.

Between t0 to t1, the main switch is on and the magnetizing current flowing through the primary winding build up to a peak current level reached at t1. During this time interval energy is stored in the magnetizing current of the transformer Tr1, 1200.

At t1 the main switch M1, 210, turns off and the magnetizing current will start flowing into the secondary winding via M2, 1040 and the output load which is formed by the output capacitor Co, 333, and the load, $R_{Load}$, 330. At t2 Sx, 4040 will turn on.

Between t1 to t3 the energy accumulated in the magnetizing current in between t0 to t1 is fully transferred to the load at t3 when the current through Ls reaches zero.

Between the t3 to t4 the energy stored in the parasitic capacitance reflected across the main switch presented in FIG. 10C will be transformed in magnetic energy through the magnetizing current IM(Tr1), at t4. At t4 the magnetizing current, which is the result of harvesting the energy from the parasitic oscillation, has its negative peak.

Further between t4 to t5, in the module EEM, 620, a significant portion of the energy stored in said magnetizing current will charge the storage capacitor Cs, 420.

In between t5 to t6 an oscillation is present across the main switch, M1. This oscillation is named the residual parasitic oscillation. The amplitude of these oscillations is $2*V_{CR}$ pk–pk. The residual parasitic oscillation is significantly smaller than the parasitic oscillation from FIG. 10B.

The circuit presented in 11A can operate in three modes.

The first mode of operation, named also as the solution "A", only EEM and CIM modules are activated.

In this mode of operation at t5, the VcSy, is not turned on. As a result in between t5 to t6 the residual parasitic ringing does occur, as presented in FIG. 11B, by 1010 and 1012. The amplitude of this residual parasitic oscillation are much smaller than the Parasitic oscillations depicted in FIG. 10B, in between t2 to t3. Though an attenuation of residual parasitic oscillation will occur due to losses, the amount of energy loss is not very high because the residual oscillation energy is not high.

At t6 or slight later the current injection switch Minj, 560, is turned on and a pulse of current will start flowing through the Ly, 580, winding of the transformer Tr1, said pulse of current which will reflect into the primary winding, Lp, 1210 of the transformer Tr1, and will discharge the parasitic capacitance Cp, 300 towards zero, extracting the necessary energy from Cs, 420. In some applications an additional voltage source Vinj, 600 may be necessary to ensure that the current injection pulse has the necessary energy to discharge the Cp, 300 to zero and create zero voltage switching conditions for M1.

The second mode of operation, named also as the solution "B", all three modules, EEM, CIM and EPM, will be activated.

In the second mode of operation at t5, the VcSy, is on since t5. As a result, in between t5 to t6 the residual parasitic oscillations energy is converted in magnetic energy through the magnetizing current Irr, 1020. The voltage across the main switch M1, will not have residual parasitic oscillation as is described by the continuous line 1115.

At t6 switchers Sy of EPM and Sx, EEM are turned off. The magnetizing current of Tr1, flowing through the winding Lx will start discharging the parasitic capacitance Cp, 300.

At t6 or slight later the current injection Minj, is turned on and a pulse of current will start flowing through Ly 580, current which will reflect into the primary winding of Tr1, Lp, 1210 and discharge the parasitic capacitance Cp, 300 towards zero.

Between t6 to t7 both currents, the magnetizing current Irr, 1020 and the current injection 1022 will discharge the Cp to zero prior to the main switch M1, 210 will turn on.

The third mode of operation, named also as the solution "C", all three modules, EEM, CIM and EPM, will be activated in the following way.

The switch Sy, 1020 of EPM can be turned on anytime after t4. In such case the energy from the parasitic oscillation will be divided in between charging the Cs, 420 and into the magnetizing current of Tr1, whose amplitude would depend at what point during t4 to t5 the switch Sy will be turned on.

The solutions proposed for the flyback topology give to the user of this technology a large degree of flexibility, to optimize the operation of the flyback topology in order to achieve given goals. These three modes of operations, can be applied to any topology wherein the three modules EPM, EEM and CIM are utilized.

Figure 12A:
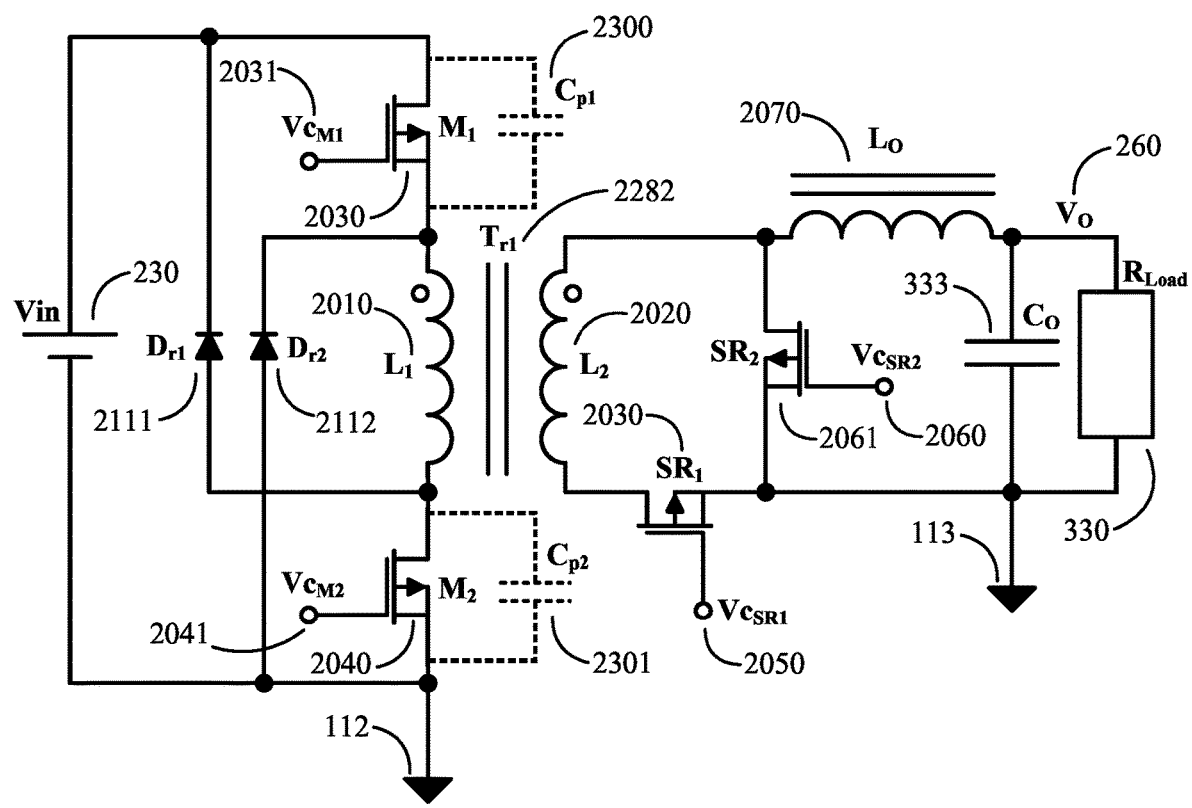
FIG. 12A presents two transistor forward topology.

Another isolated topology wherein parasitic oscillations do occur is the Two Transistor Forward Topology. In FIG. 12A is depicted the basic circuit of a two-transistor forward topology.

Is composed by two primary switching devices in the primary, M1, 2030 and M2, 2040, controlled by two control signals VcM1, 2031 and VcM2, 2041. A transformer Tr1, 2282 having a primary winding L1, 2010 and a secondary winding L2, 2020, wherein the primary winding L1, 2010 is connected to said primary switching devices, is also part of the circuit. In the secondary there are two synchronous rectifiers, SR1, 2030 and SR2, 2061, an output inductor, Lo, 2070 connected to the output load circuit, composed by an output capacitor Co, 333 and a Rload, 300.

Figure 12B:
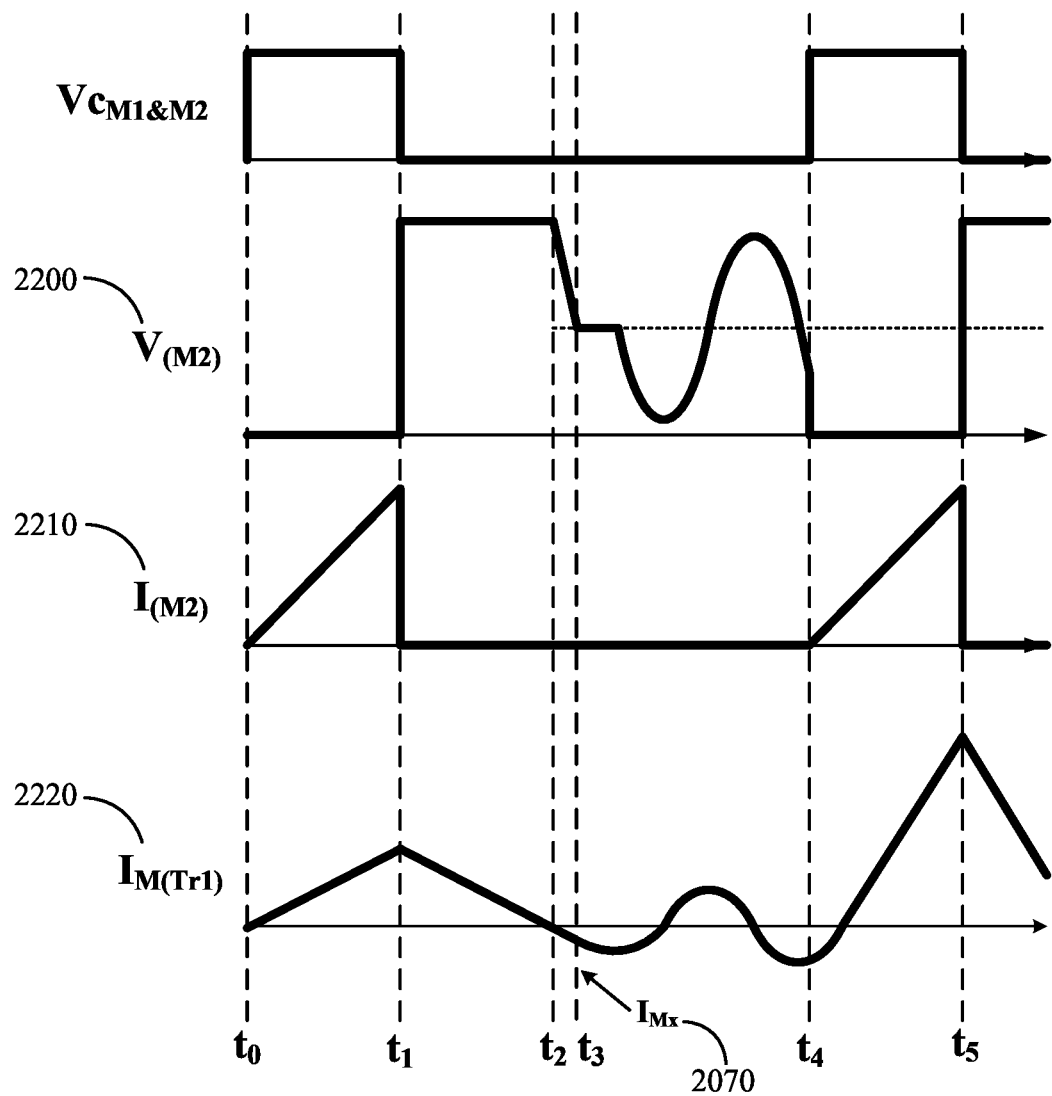
FIG. 12B depicts the key waveforms of the circuit from FIG. 12A.

In FIG. 12B are presented the key waveforms of the topology presented in FIG. 12A. The key waveforms presented in FIG. 12B are: VcM1 & VcM2, the voltage across M2, V(M2), 2200, the current through the primary switching elements, I(M2), 2210 and the magnetizing current through TR1, IM(Tr1), 2220.

Between t0 to t1 the primary switchers M1, 2030 and M2, 2040 are on and current starts flowing through said switchers and the primary winding of the transformer, L1, 2010. In the secondary the current flows through SRL 2030 and Lo, 2070 towards the output load formed by Co, 333 and $R_{Load}$, 330. During this time period the magnetizing current also builds up as depicted by IM(Tr1), via the current through the primary winding L1, 2010.

Between t1 to t2 the magnetizing current will open diodes Dr1 and Dr2 and during this time the reset of the transformer Tr1, 2282 will occur.

At t2 the parasitic capacitances reflected across M1 and M2, have stored an energy which is presented in FIG. 12C1.

Figure 2A:
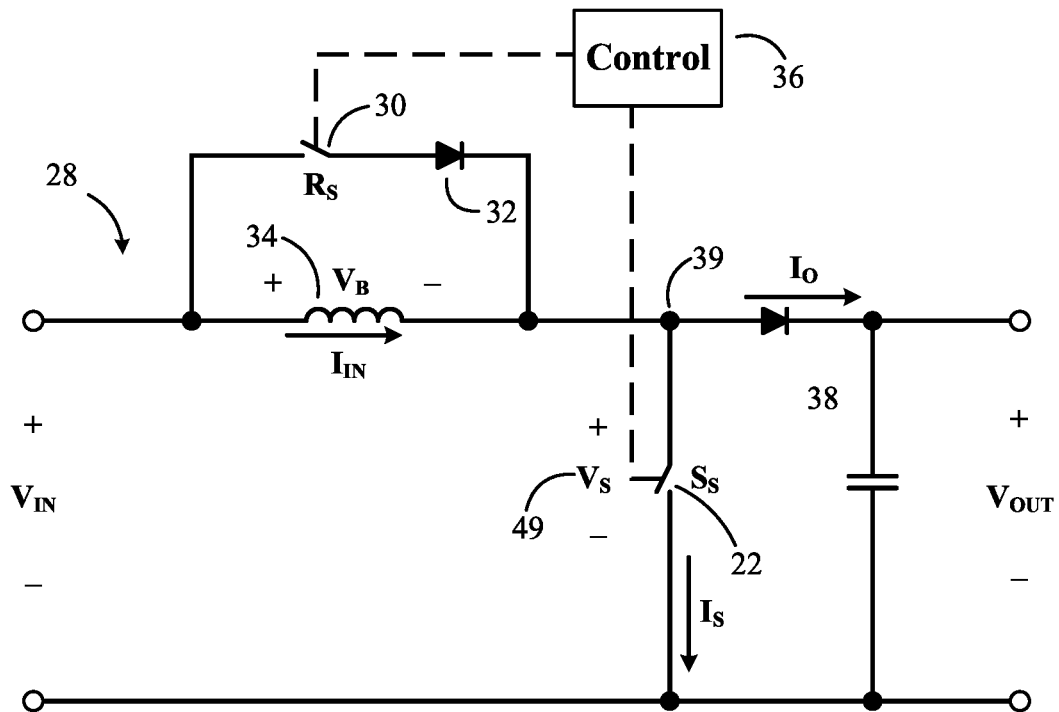
FIG. 2A depicts a prior art circuit.
Figure 2B:
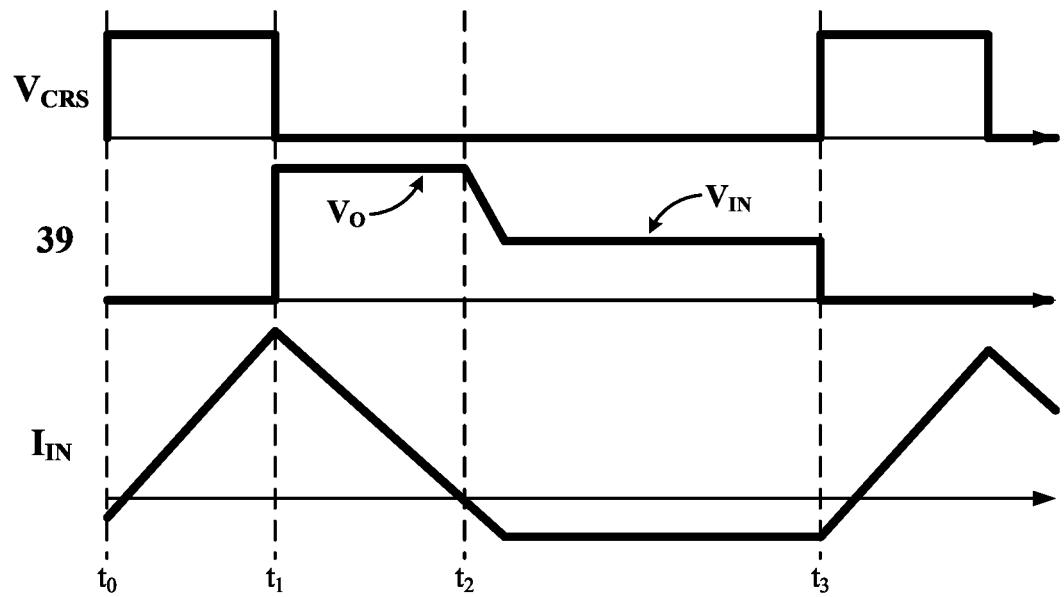
FIG. 2B depicts the key waveforms of the circuit depicted in FIG. 2A.

In Between t2 to t3, the energy stored in the parasitic capacitances Cp1 and Cp2 will convert in magnetic energy through magnetizing current IMx, 2070 whose formula is presented in FIG. 12C2.

In between t3 to t4, also named the dead time period wherein parasitic oscillation do occur, oscillation created by the resonant circuit formed by the inductance of the primary winding and the parasitic capacitances reflected across the switching element, Cp1 and Cp2. This resonant circuit is energized by the magnetic energy stored in Tr1, 2282, $W_{p\text{-}TT\,forward}$ presented in FIG. 12C1 via the magnetizing current $I_{Mx}$, 2070 presented in FIG. 12C2.

Figure 13A:
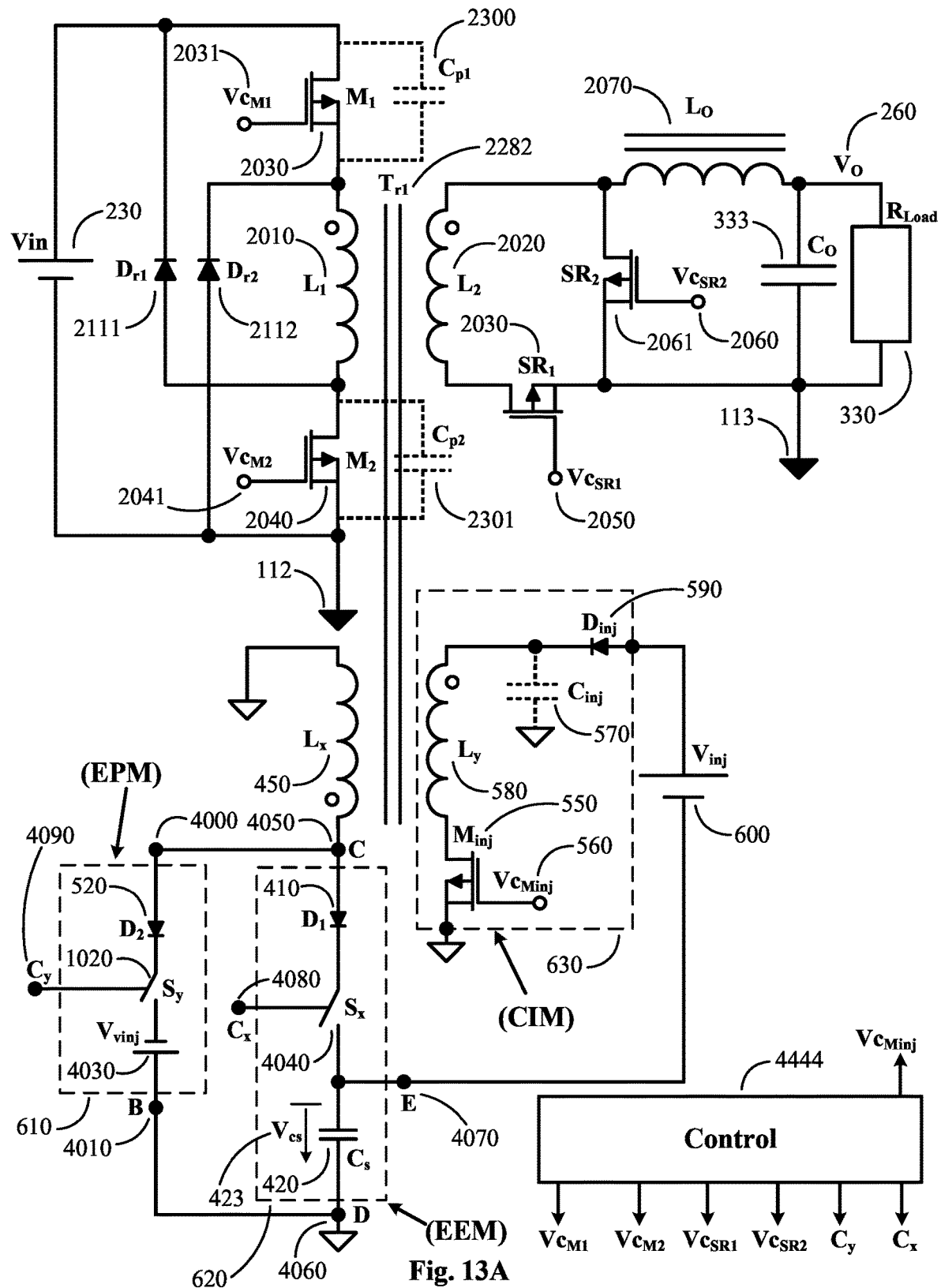
FIG. 13A is presented the two-transistor forward topology using EPM, EEM and CIM modules placed on auxiliary windings.

In FIG. 13A is depicted the two transistor forward topology using the three modules, EEM, EPM and CIM placed on auxiliary windings of Tr1, 2282.

Figure 13B:
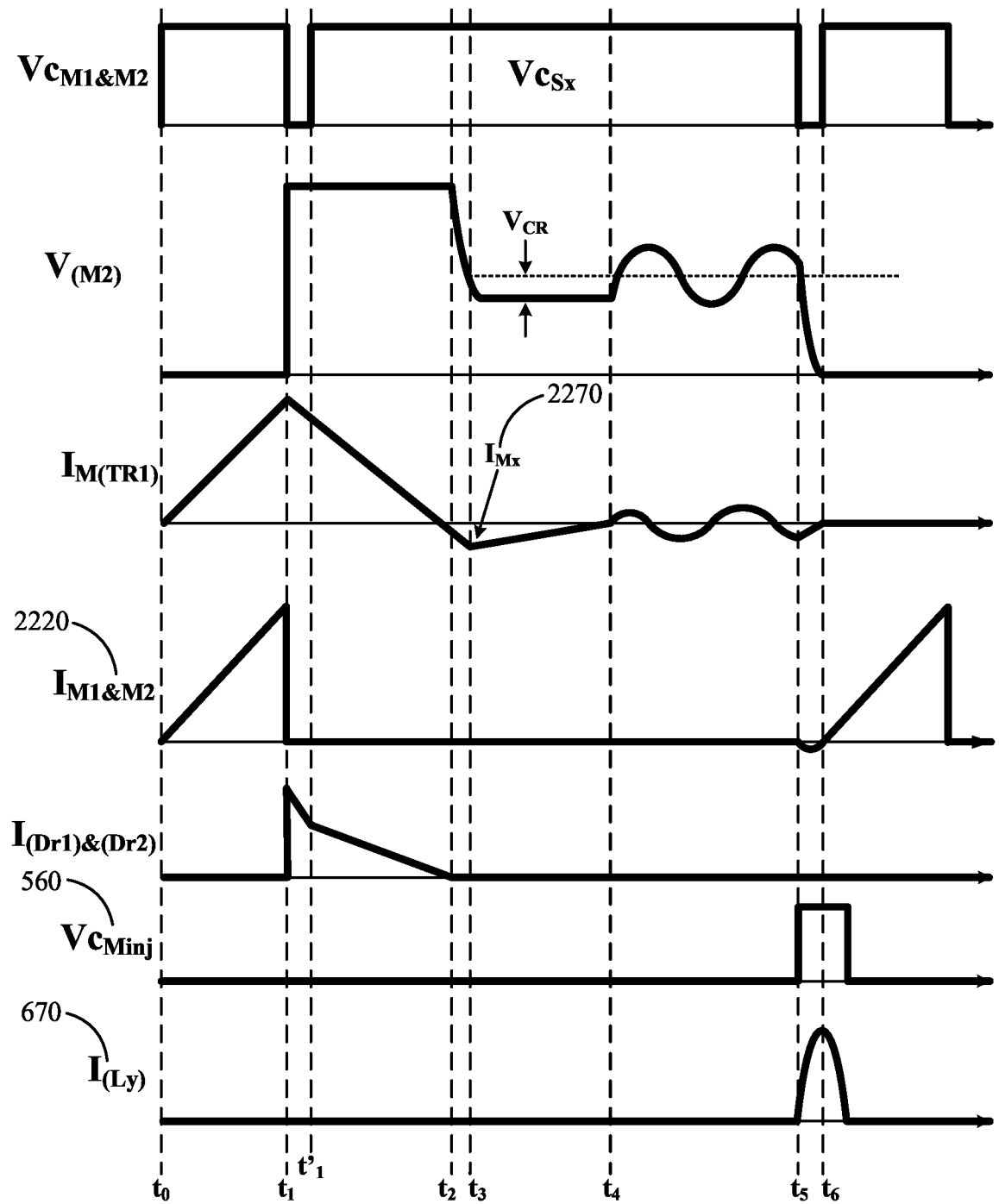
FIG. 13B depicts the key waveforms of the circuit from FIG. 13A activating only the EEM and CIM.

In FIG. 13B are depicted the key waveforms of the circuit presented in FIG. 13A.

In between t0 to t1 both switchers M1, 2030 and M2, 2040, are turned on and during this time the magnetizing current will build up reaching its peak at t1.

At t1', the switch Sx, 4040 of the EEM is turned on.

As presented in FIG. 1 the switching node contains a first switch S, 110, a second switch Sn which turns on after the primary switch, and after the second switch turns off, the dead time does occur, wherein during the dead time the parasitic oscillations are initiated. The module EPM from presented in FIG. 1B does have a switch Sy, 4020, which is complementary to the first switch.

In two transistor forward topology the first switch is M1 and M2, the second switch is Dr1 and Dr2 and the switch Sy of the EPM module is complementary to the first switch. This is depicted in FIG. 13B, by VcM1&M2 and VcSx.

In between t1 to t2 the magnetizing current decreases to reach zero at t2. The time interval t1 to t2 is referred to as the reset time of the transformer Tr, 2282. The energy stored in the leakage inductance in between the primary winding L1, 2010, and secondary winding, 2020, is transferred back to the input voltage source Vin, 230, after t1 when the switchers M1 and M2 are turning off.

At t2, the parasitic capacitances reflected across M1 and M2, have an energy $W_{p\text{-}TT\,forward}$, whose formula is presented in FIG. 12C1. In between t2 to t3, electrical energy stored in the parasitic capacitances C1 and C2 is converted into magnetic energy via the magnetizing current IMx, 2070.

At t3 the magnetizing current $I_M(T_{R1})$ reaches a negative amplitude IMx, 2070. In between t3 to t4 the magnetizing current IMx which flows via D1, 410, Sx, 4040, and Cs, 420, is charging the capacitor Cs.

Figure 13C:
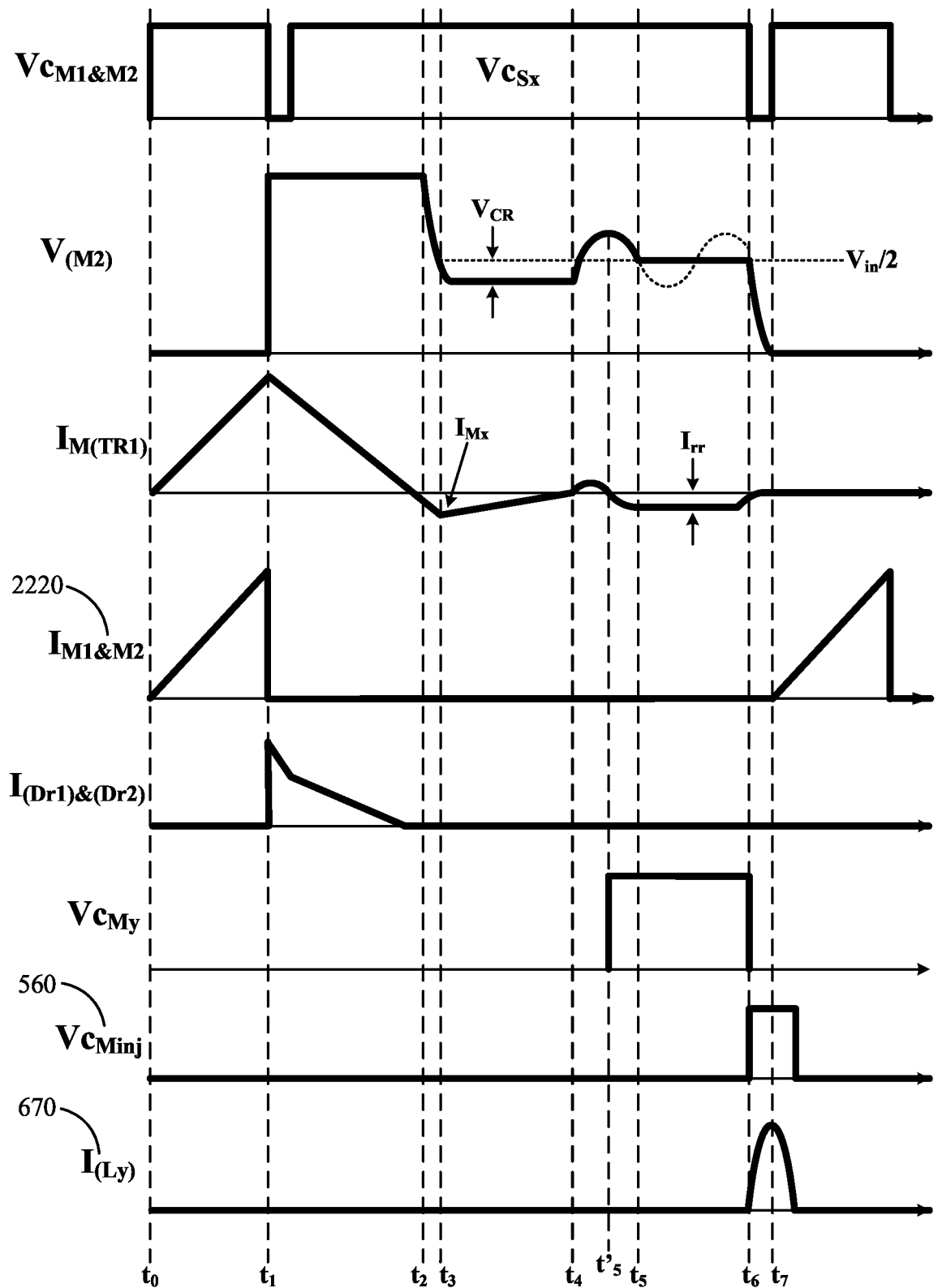
FIG. 13C depicts the key waveforms of the circuit from FIG. 13A activating EPM, EEM and CIM.

In between t4 to t5 across M2 there are residual parasitic oscillation of the pk–pk amplitude of $2*V_{CR}$ In FIG. 13C is presented Two Transistor Forward topology wherein several modules are added. The first module is the "energy extraction of the parasitic energy module", EEM, 620. It is formed by the switch Sx, 405, diode D1, 410 and the energy storage capacitor Cs, 420. As previously presented the role of this module is to extract a significant portion of the energy contained in the parasitic oscillation's and to store in the capacitor Cs, 420.

The second module presented in FIG. 13A is the "energy preservation module", EPM, 610, formed by the switch Sy, 1020, and diode D2, 520 and the voltage source Vvinj, 4030. As previously presented, the role of the module is to extract residual parasitic oscillation energy and preserve it in the magnetic energy via the magnetizing current.

The third module presented in FIG. 13A is the "current injection module", CIM, 630, formed by the switch Minj, 550, the control signal for the current injection, VcMinj, 560, The current injection winding Ly, 580, coupled with the primary winding L1, 2010 and the secondary winding 2020, the current injection diode, Dinj, 590 and an optional capacitor, Cinj, 570. The energy for the current injection circuit is provided by the energy storage capacitor, Cs, 420, from module 620. In some applications an additional voltage source, Vinj, 600 is added to ensure that the current injection circuit has the necessary energy to discharge the parasitic capacitances, Cp1, 2300, and Cp2, 2301, parasitic capacitors reflected across the main switch, M1, 2030 and M2, 2040. The "current injection module" extracts the energy from the storage capacitor Cs, 420 and uses that energy and in some applications, additional energy provided by Vinj, 600 and uses that energy to discharge said parasitic capacitances reflected across the switchers M1 and M2.

In FIG. 13B are depicted the key waveforms for the circuit from FIG. 13A, wherein only EEM and CIM are activated. The key waveforms presented in FIG. 13B are: the control signal on the main switch M1&M2, VcM1, 2031, and VcM2, 2041, the control signal of the Sx switch, VcSx the voltage across the main switch, V(M2), the magnetizing current IM(TR1) through the transformer Tr1, the current through M1&M2, 2220, the current through Dr1 and Dr2, the control signal for the Minj, Vc(Minj), 560, and the current injection flowing through Ly winding of Tr1, I(Ly), 670.

Between t0 to t1, the main switch is on and the magnetizing current flowing through the primary winding builds up to a peak current level reached at t1. During this time interval energy is stored in the magnetizing current of the transformer Tr1, 2282. In the same time in between t0 to t1 energy is transferred to the secondary, via SR1, 2030 and the secondary winding L2, 2020 and through Lo, 2070.

At t1' the switch switch Sx, of the EEM module is turned on.

At t1 the main switch M1, 2030 and M2, 2040 are turned off. and the magnetizing current will start flowing through the diodes, Dr1, 2111 and Dr2, 2112 into the input voltage source, Vin, 230. At t2 the transformer Tr1, 2282 is fully reset.

Between the t2 to t3 the energy stored in the parasitic capacitances reflected across the M1 and M2 presented in FIG. 12C1 will be transformed in magnetic energy through the magnetizing current IMx, 2070, whose formula is presented in FIG. 12C2.

Further in between t3 to t4, in the module EEM, 620, a significant portion of the energy stored in said magnetizing current, IMx will charge the storage capacitor Cs, 420.

In between t4 to t5 an oscillation is present across the main switch, M1. This oscillation is named the residual parasitic oscillation. The amplitude of these oscillations is $2*V_{CR}$ pk–pk. The residual parasitic oscillation is significantly smaller than the parasitic oscillation from FIG. 12B.

At t5 or slight after t5 the current injection switch Minj, 560, is turned on and a pulse of current will start flowing through the Ly, 580, winding of the transformer Tr1, said pulse of current which will reflect into the primary winding, L1, 2010 of the transformer Tr1, and will discharge the parasitic capacitance Cp1, 2300 and Cp2, 2301 towards zero, extracting the necessary energy from Cs, 420. In some applications an additional voltage source Vinj, 600 may be necessary to ensure that the current injection pulse has the necessary energy to discharge the Cp1 and Cp2, to zero and create zero voltage switching conditions for M1 and M2.

In FIG. 13C is presented the operation of the circuit depicted in FIG. 13A wherein all three modules, EPM, EEM and CIM are activated. The key waveforms presented in FIG. 13C are: VcM1 and VcM2, the control signal for Sx, the voltage across M2, the magnetizing current IM(TR1), through the transformer TR1, 2282, the current through M1 and M2, the current through the reset diodes, Dr1 and Dr2, the control signal for Sy, the control signal for Minj, and the current injection flowing through the winding Ly. From t0 to t4 the key waveforms in FIG. 13C are identical to the key waveforms form FIG. 14B.

At t4 the residual parasitic oscillation will start and that is depicted with dotted line in V(M2).

At t5' during the first residual parasitic oscillation the switch Sy from the module EPM is turned on. The switch Sy is trapping the negative magnetizing current Irr between t5 to t6 as depicted by the magnetizing current IM(TR1).

At t6, both switchers, SX and Sy will turn off and the magnetizing current Irr will be released from the short created by Sy and start discharging the parasitic capacitance reflected across M1 and M2. The discharge of the parasitic capacitances will have the same amplitude as the amplitude of the residual parasitic ringing reported to the steady state level, Vin/2.

However, at t6 or slight after t6 the current injection switch Minj is turned on and as result a pulse of current will start flowing through the Ly winding and reflect into the primary winding L1, and will discharge the parasitic capacitances, Cp1 and Cp2 to zero creating zero voltage switching conditions for M1 and M2 at turn on at t7.

Other modes of operation can be derived by turning on the Sy anytime between t3 and t4, and in this way the parasitic oscillation energy can be spit in between the electrical energy which is stored in Cs, 420 and the magnetic energy via the magnetizing current.

The solutions proposed for the two-transistor forward topology give to the user of this technology a large degree of flexibility, to optimize the operation of the two transistor forward topology in order to achieve given goals.

Figure 14A:
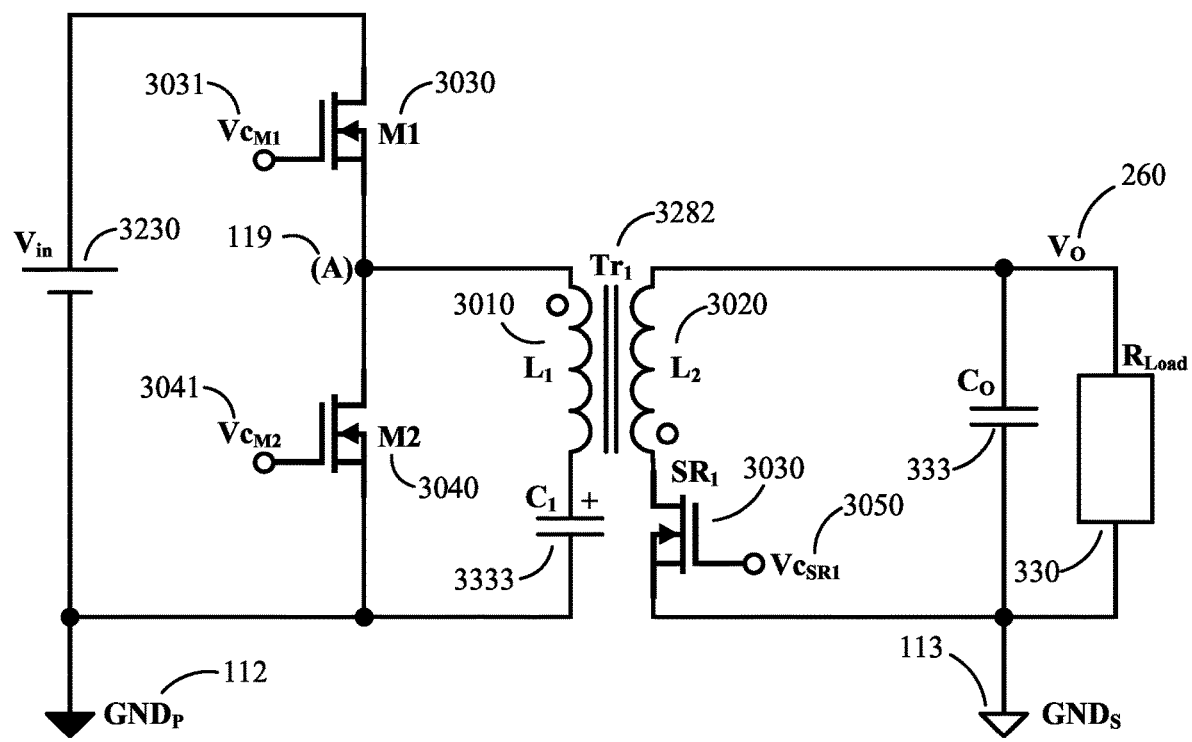
FIG. 14A depicts topology of a flyback derived, single ended asymmetrical half bridge.

Parasitic oscillations do occur also in half bridge derivatives such as single ended flyback derived asymmetrical half bridge. FIG. 14A illustrates a simplified schematic of electronic circuitry of a power converter utilizing the flyback derived, single ended asymmetrical half bridge topology. It is composed by two totem pole switchers, M1,3030, and M2,3040, and a transformer Tr1, 3282, which contains a primary winding L1, 3010 and a secondary winding, L2 3020 wherein the primary winding is connected to the connecting between M1 and M2, referred to in this specification as switching node A, 119 and the second termination of the primary winding is connected to the resonant capacitor C1, 3333. The drain of M1, 101 is connected to the input voltage source, Vin, 3230 and the source of M2, 3040 and the termination of C1, 3333 not connected to the primary winding are connected to the negative polarity of the input voltage source Vin, 3230, and to the input ground, GNDp, 112.

Figure 14B:
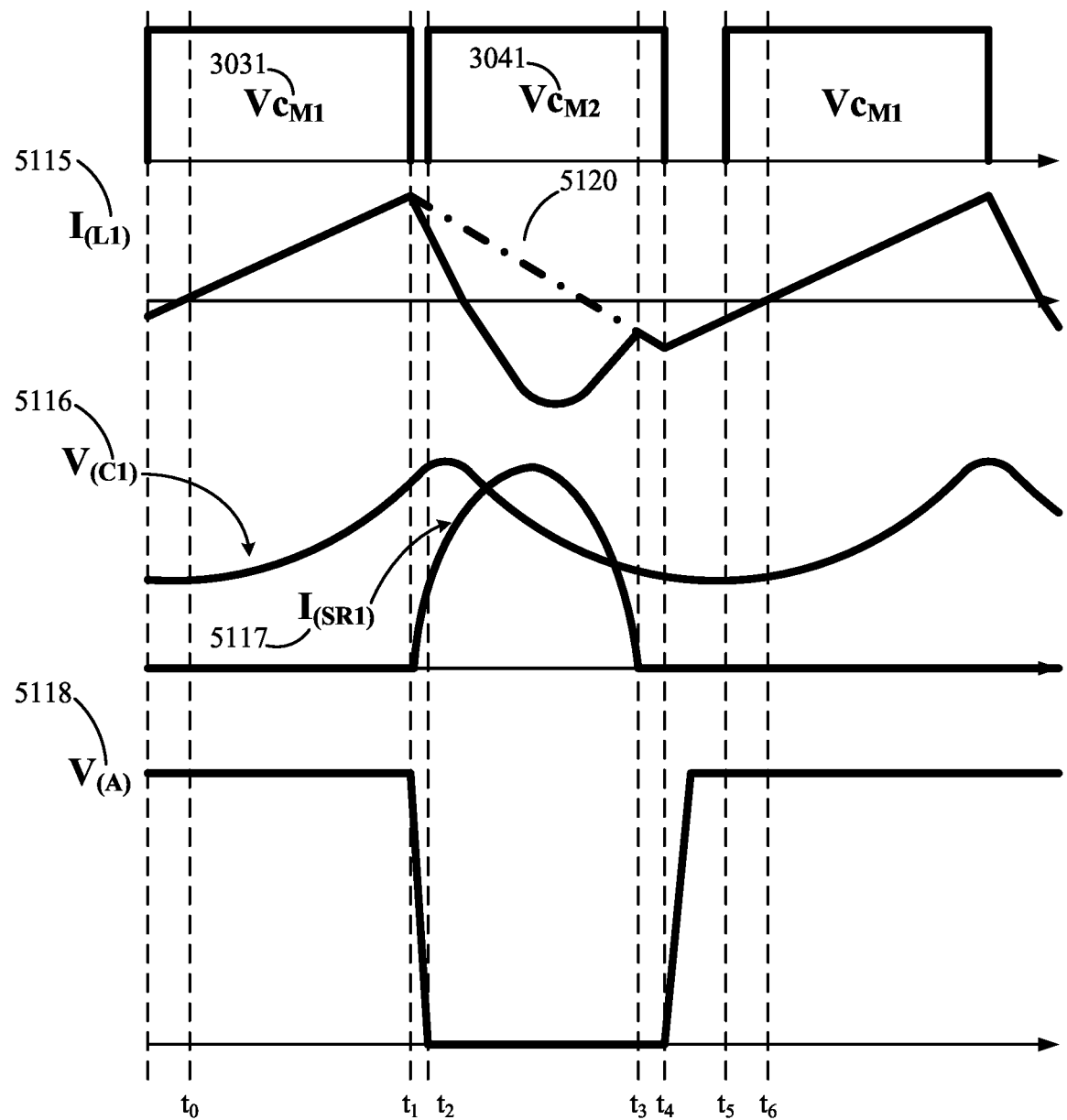
FIG. 14B depicts the key waveforms of the circuit from FIG. 14A.

The mode of operation of the single ended asymmetrical half bridge is depicted in FIG. 14B. In FIG. 14B are depicted the key waveforms such as $V_{cM1}$, 3031 and VcM2, 3041 which represent the control signal for M1, 3030, and M2, 3040. In FIG. 14B is further presented the current through L1, 5115 and the magnetizing current, 5120. Further in FIG. 14B is presented also the voltage across the resonant capacitor C1, V(C1), 5116 and the current through the secondary synchronous rectifier SR1, I(SR1), 5117. Further in FIG. 14B is depicted also the voltage in the switching node, A, V(A), 5118.

The waveforms depicted in FIG. 14B apply for the operation in continuous mode. We define the continuous mode operation as the operation wherein the Vc1M1 and Vc2M2 are successive to each other with a given dead time in between and without blanking phases. In discontinuous mode of operation there is an extended dead time following the on time of M2, 102, when no energy is processed, said extended dead time which is at least several times larger than the said dead time between VcM1, 3031, and VcM2, 3041 in continuous mode of operation.

Figure 14C:
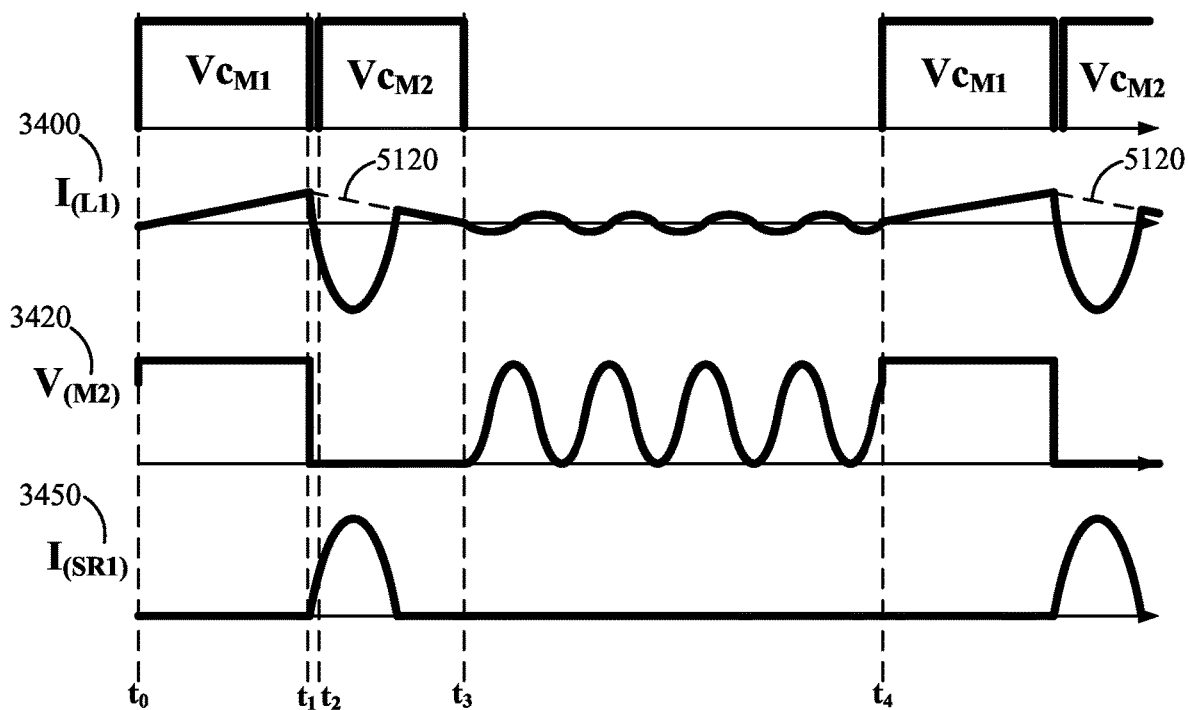
FIG. 14C depicts the key waveforms of the circuit from FIG. 14A operating in discontinuous mode.

A very low output power there are two modes of operation. One mode wherein the on time for M1 switch is on followed by an on time of M2 switch and followed by an extended dead time, as previously described. In addition to the modulation of on time of the M1 switch the extended dead time can be also modulated to decrease the power taken form the input. This mode of operation is depicted in FIG. 14C.

The second mode of operation at light load is by using a train of pulses, which are a succession of on time for M1 switch followed by on time for M2 switch, operation as described in continuous mode, followed by an extended dead time.

Like the flyback topology operating in discontinuous mode during the extended dead time there is an oscillation caused by the resonance in between the primary inductance L1, 3010, and the parasitic capacitance reflected in the switching node A, 119.

The continuous mode of operation is depicted in FIG. 14B.

Between t0 to t1 the upper switch M1, 3030 is turned on and the current through the transformer primary winding, L1, 3010 is building up until it reaches a determined peak level.

At t1 the upper switch M1, 3030, turns off and the magnetizing current in the transformer Tr1, 3282 forces the conduction further through the body diode of M2, 3040. The interval t1 to t2 by design is made to be relatively short to minimize the dissipation through the body diode.

At t2 the lower switch M2, 3040 is turned on and the magnetizing current continues to flow through M2, L1 and resonant capacitor C1, 3333. The magnetizing current is depicted in a dotted line, 5120. In addition to the flow of the magnetizing current there is another quasi-resonant current which is the result of the resonance in between the resonant capacitor C1,3333 and the leakage inductance between L1, 3010 and L2, 3020, of the transformer Tr1, 3282. The current reflected in the secondary has a half sinusoidal shape. The half sinusoidal shape of the secondary current, reflected in the primary via L1, 3010 is added to the magnetizing current flowing in the primary winding as depicted by I(L1), 5115.

At t3 the current in the secondary through SR1, 3030 reaches zero and turns off the SR1. The SR1 can be replaced by a diode function of the application. In this specification, we refer to SR1 as a "rectification means" which includes any rectification device which conducts in one direction, and it is an open circuit when the current reverses.

Between t3 to t4 the current in the primary winding L1, 3010, is reduced to the magnetizing current. The voltage across the C1 continues to increase the magnetizing current into the negative polarity. The longer the time interval between t3 to t4 the larger the decay of the magnetizing current into a negative polarity.

Because the negative magnetizing current will charge the parasitic capacitance reflected in the switching node A,119 and will flow further through the body diode of M1, 3030 creating zero voltage switching condition somewhere in between t4 to t5, the time interval t3 to t4 is an element in the design.

At t5 the upper switch M1, 3030, is turned on at zero voltage switching conditions.

At t6 the magnetizing current,5120, crosses zero and the cycle repeats again.

During the time interval t0-t1 energy is extracted from the input voltage source and is injected in the magnetizing current of Tr1, 3282 and in the same time energy is injected into the resonant capacitor C1, 3333. During the time interval between t1 to t3 the energy extracted from Vin, 3230, in between t0 to t1, is delivered to the output via the rectifier means, SR1. A significant portion of the energy transferred to the secondary is done in a resonant way, wherein the current in the secondary is shaped in half sinusoidal shape. In between t1 to t3 a quantum of energy is transferred to the secondary.

The operation in discontinuous mode, hard switching for M1, 3030, may occur as well as depicted in FIG. 14C at t4. In FIG. 14C the M1,3030, switch is on in between t0 to t1, followed by the dead time from t1 to t2 further followed by the turning on of M2 switch, between t2 to t3. During the "extended dead time", which occurs after t3 there is an oscillation between the primary inductance L1, 3010 of the transformer Tr1, 3282 and the parasitic capacitance reflected in the switching node A, 119. The parasitic capacitance reflected in the switching node incorporates the parasitic capacitances of M1, 3030, and M2, 3040, and additional parasitic capacitance reflected across the primary winding of the transformer Tr1, 3282.

Figure 15A:
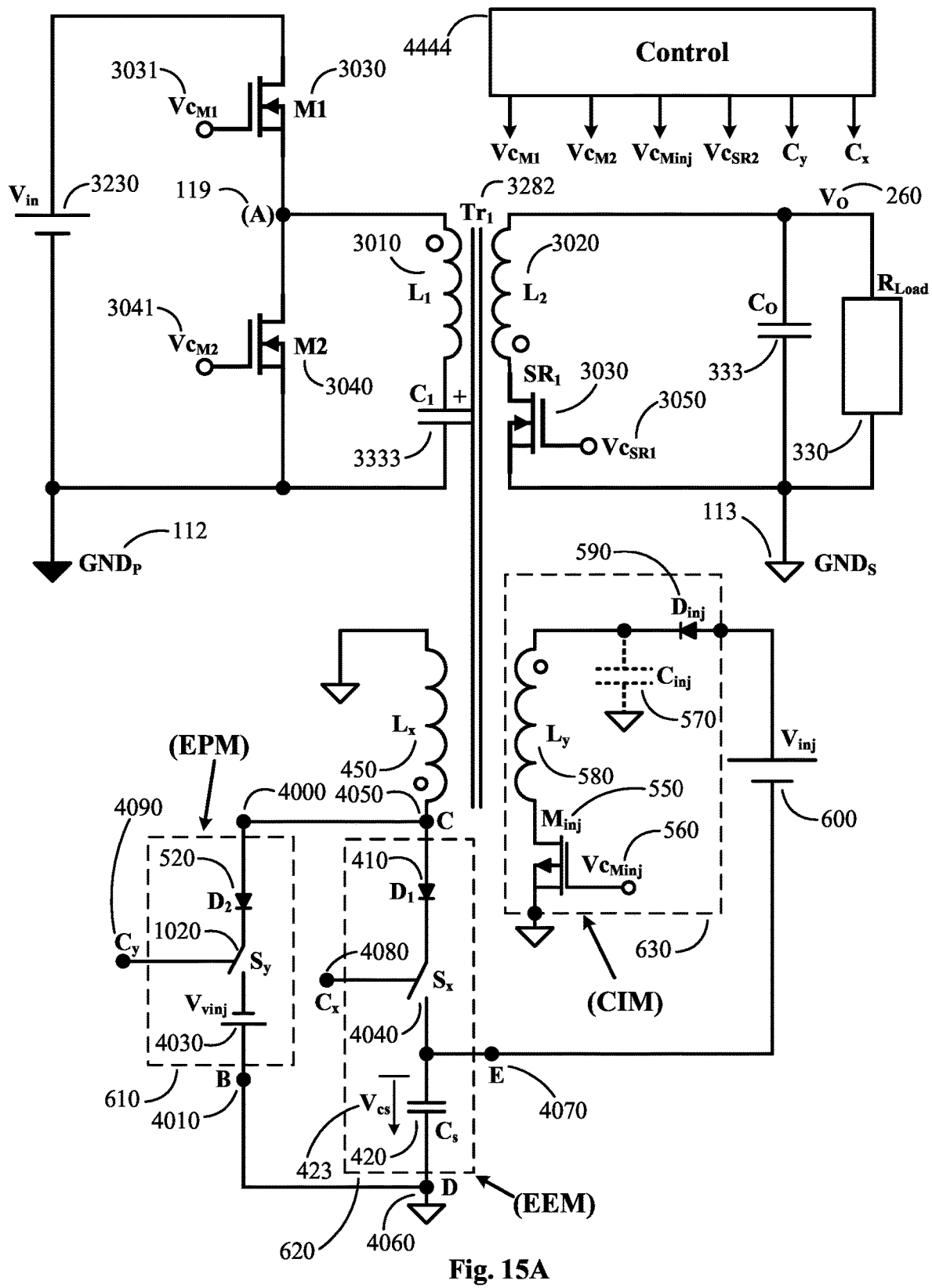
FIG. 15A depicts topology of a flyback derived, single ended asymmetrical half bridge using the EPM, EEM and CIM.

In FIG. 15A is presented the flyback derived single ended asymmetrical half bridge, from FIG. 14A wherein the following EPM, EEM and CIM modules are connected. The EPM and EEM modules can be placed directly in between the switching node A, 119 and the input ground, GNPp, 112 or can be connected across auxiliary winding such as Lx, 450 and Ly, 580 as depicted in FIG. 15A.

Figure 15B:
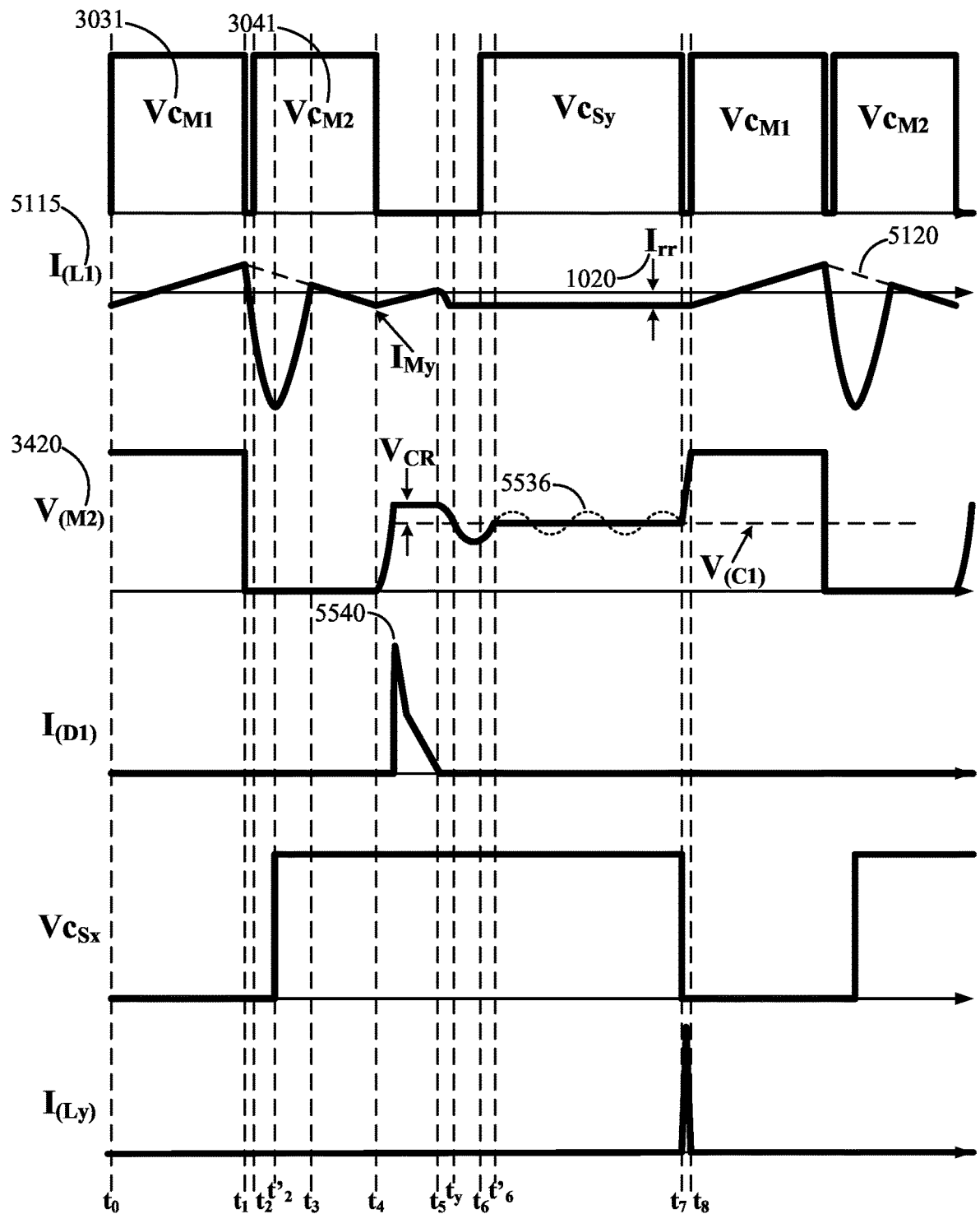
FIG. 15B depicts the key waveforms of the circuit from FIG. 15A.

The key waveforms of the circuit from FIG. 15A are presented in FIG. 15B.

In between t0 to t1 the upper switch M1, 3030 is turned on and the magnetizing current starts to build up through the transformer Tr1, 3282. During this time interval the capacitor C1 is charged via the current through the primary winding L1,3010 of the transformer 3282. At t1 the upper switch M1 turns off and the current through L1, 3010 will flow further via the body diode of M2, 3040.

At t2 the lower switch M2 turns on and the current through L1 will flow via M2. The leakage inductance of the transformer Tr1, 3282 forms a resonant circuit with the capacitor C1, 3333. A quasi-resonant current in half sinusoidal shape will flow via the primary and secondary winding. A quantum of energy is transferred from the primary to the secondary between t1 to t3.

At t3 the quasi-resonant current flowing in the secondary via SR1, 3030 will reach zero at t3 and Sr1 turns off.

In between t3 to t4 the magnetizing current in the transformer Tr1, 3282 will further decay towards negative polarity, reaching a negative peak IMy at t4.

In between t4 to t5 a significant portion of the parasitic oscillation energy will be stored in Cs, 420, charged by I(D1) 5540.

At t5, the residual parasitic oscillations will start, powered by the energy in the parasitic capacitance reflected across switching node A and the steady state voltage in the switching node which is the voltage across C1.

The amplitude of the residual parasitic oscillation, 5536, is much smaller than the amplitude of the parasitic oscillations.

At t6 two options are available.

The first option wherein Sy switch from EPM is not turned on and the residual parasitic oscillations do occur as depicted by 5536.

At t7 the current injection switch, Minj, 550 from the CIM is turned on. A pulse of current, I(Ly) is injected into the Ly winding, which is further reflected into the primary winding L1, 3010 flowing towards the positive termination of the Vin, 3230 discharging the parasitic capacitance reflected in the switching node A, and creating zero voltage switching conditions on M1, at t8 when the switch M1 turns on.

Another mode of operation is by turning on the Sy switch from the EPM module at t6. Turning on the switch Sy at t6 is the optimal way to extract the energy from the residual parasitic oscillation and convert it into the magnetic energy via the magnetizing current Irr, 1020. The optimum time to turn on Sy, is in between ty to t6' during the first residual parasitic oscillations. After Sy is turned on the residual parasitic oscillations, 5536 disappears. And the full energy of the residual parasitic oscillation is harvested in Irr, 1020.

There are other modes of operation function of the time Sy is turned on. The Sy can be turned on anytime after t4 and in such a mode of operation the energy from the parasitic oscillations splits in between storing said energy into the electrical energy via the storage capacitor Cs, 420, and in magnetic energy via the magnetizing current. The designer has flexibility to use the energy extracted from the parasitic oscillation and store it in electrical energy via the voltage across Cs, 420 and magnetic energy via the magnetizing current in the transformer Tr1, 3282.

At t7 or slight later, the current injection switch Minj is turned on and a pulse of current is developed in the current injection winding, Ly and further reflected in the primary winding L1, 3010. The current injection induced in the primary winding will discharge the parasitic capacitance in the switch node A, creating zero voltage switching conditions for M1 at t8. The discharge of the parasitic capacitance reflected in A is also facilitated by the magnetizing current Irr, 1020 which is harvested from the residual parasitic oscillations. By using the module EEM and EPM and CIM, all the energy from the parasitic oscillations during the dead time can be harvested and used to achieve zero voltage switching conditions for M1, 3030 in any operating conditions. The auxiliary windings which are connected to EEM and EPM can also have a dual purpose such as shielding winding in the transformer application facilitated by the fact that one of the terminations of the auxiliary winding connected to EEM and EPM are connected to ground.

What is claimed is:

1. A switching power conversion apparatus, for converting power from an input voltage source to an output load, comprising:
    the input voltage source;
    the output load;
    a first switch connected to a switching node;
    a second switch connected to the switching node, wherein the second switch is turned on after the first switch turns off;
    the switching node is connected to a primary winding of a transformer;
    the transformer has at least one secondary winding;
    the transformer has at least two auxiliary windings, defining at least first and second auxiliary windings;
    the primary winding of the transformer is connected to the switching node, the primary winding is connected to deliver energy via the first and second switches from the input voltage source to the output load during a succession of power conversion cycles;
    a current injection circuit containing a current injection switch, a current injection diode, and a current injection voltage source which are connected across the first auxiliary winding, wherein the current injection switch is turned on prior to the first switch turning on and is turned off after the first switch turns on;
    a current injection capacitor is connected between (a) a termination of the current injection switch which is not connected to the first auxiliary winding and (b) a cathode of the current injection diode;
    a capacitance connected to the switching node, wherein:
        the capacitance is configured to resonate with an inductive element during a portion of the power conversion cycles to cause a parasitic oscillation unrelated to the power conversion cycles; and
    a first clamp subcircuit placed across the second auxiliary winding containing a unidirectional auxiliary switch, formed by a switch in series with a diode, and further in series with a storage capacitor, to trap energy in the transformer and prevent the parasitic oscillation and store the energy in the storage capacitor, wherein the auxiliary switch is complementary to the first switch; wherein the storage capacitor is in series with current injection voltage source.

2. The apparatus of claim 1, wherein the transformer is part of a flyback converter.

3. The apparatus of claim 1, wherein the transformer is part of a forward converter.

4. The apparatus of claim 1, wherein the transformer is part of a half bridge converter.

5. The apparatus of claim 1, wherein the transformer is part of a full bridge converter.

6. A switching power conversion apparatus, for converting power from an input voltage source to an output load, comprising:
    the input voltage source;
    the output load;
    a first switch connected to a switching node;
    a second switch connected to the switching node, wherein the second switch is turned on after the first switch turns off;
    a transformer a primary winding, at least a secondary winding, and first and second auxiliary windings;
    the primary winding is connected to the switching node, the primary winding is connected to deliver energy via the first and second switches from the input voltage source to the output load during a succession of power conversion cycles;
    a current injection circuit containing a current injection switch, a current injection diode, and a current injection voltage source are connected across the first auxiliary winding, wherein the current injection switch is turned on prior to the first switch turning on and is turned off after the first switch is turned on;
    a current injection capacitor connected between (a) a termination of the current injection switch which is not connected to the first auxiliary winding and (b) a cathode of the current injection diode;
    a capacitance connected to the switching node, wherein the capacitance is configured to resonate with the primary winding during a portion of the power conversion cycles to cause a parasitic oscillation unrelated to the power conversion cycles;
    a first clamp subcircuit placed across the second auxiliary winding containing a unidirectional auxiliary switch in series with a storage capacitor to trap energy from the transformer and prevent the parasitic oscillation and store the energy in a storage capacitor;
    wherein the auxiliary switch is complementary to the first switch, and the storage capacitor is in series with the current injection voltage source;
    a second clamp subcircuit placed across the second auxiliary winding containing a unidirectional auxiliary switch in series with a controlled voltage source; and
    the controlled voltage source to inject energy in the secondary auxiliary winding to control amplitude of a magnetizing current of the transformer at a determined level, when the unidirectional auxiliary switch turns off to discharge the parasitic capacitance to a given voltage by using the trapped energy in the transformer in addition to the injected energy from the controlled voltage source.

7. The apparatus of claim 6, wherein the transformer is part of a flyback converter.

8. The apparatus of claim 6, wherein the transformer is part of a forward converter.

9. The apparatus of claim 6, wherein the transformer is part of a half bridge converter.

10. The apparatus of claim 6, wherein the transformer is part of a full bridge converter.

* * * * *